US012621323B2

(12) United States Patent
Zhang et al.

(10) Patent No.: US 12,621,323 B2
(45) Date of Patent: May 5, 2026

(54) CONTENT-OBLIVIOUS FRAUDULENT EMAIL DETECTION SYSTEM

(71) Applicant: Salesforce, Inc., San Francisco, CA (US)

(72) Inventors: Xiao Zhang, Sammamish, WA (US); Robin Stuart, Pacifica, WA (US); John Seymour, Bothell, WA (US)

(73) Assignee: Salesforce, Inc., San Francisco, CA (US)

( * ) Notice: Subject to any disclaimer, the term of this patent is extended or adjusted under 35 U.S.C. 154(b) by 250 days.

(21) Appl. No.: 18/309,580

(22) Filed: Apr. 28, 2023

(65) Prior Publication Data

US 2024/0364723 A1     Oct. 31, 2024

(51) Int. Cl.
*H04L 9/40*          (2022.01)
*G06F 40/211*     (2020.01)
*H04L 51/21*        (2022.01)

(52) U.S. Cl.
CPC ........ *H04L 63/1425* (2013.01); *G06F 40/211* (2020.01); *H04L 51/21* (2022.05)

(58) Field of Classification Search
CPC ..... H04L 63/1425; H04L 51/21; G06F 40/211
See application file for complete search history.

(56) References Cited

U.S. PATENT DOCUMENTS

| | | | | | |
|---|---|---|---|---|---|
| 10,447,635 | B2 * | 10/2019 | Sathi | ..................... | H04L 51/212 |
| 10,834,127 | B1 * | 11/2020 | Yeh | ........................ | G06N 20/00 |
| 11,050,881 | B1 * | 6/2021 | McCann | ............. | H04M 3/5233 |
| 11,741,400 | B1 * | 8/2023 | Fu | ........................... | G10L 17/06 |
| | | | | | 705/5 |
| 12,095,717 | B1 * | 9/2024 | Perrin | ................... | H04L 51/212 |
| 2016/0344770 | A1 * | 11/2016 | Verma | ..................... | H04L 51/42 |
| 2020/0067861 | A1 * | 2/2020 | Leddy | ................ | G06F 21/6245 |
| 2020/0293655 | A1 * | 9/2020 | Long | ...................... | G06N 20/00 |
| 2021/0019665 | A1 * | 1/2021 | Gur | ...................... | G06N 20/20 |
| 2022/0172037 | A1 * | 6/2022 | Kang | ...................... | G06N 3/044 |
| 2023/0229492 | A1 * | 7/2023 | Rakshit | ................. | G06F 9/4881 |
| | | | | | 718/103 |
| 2023/0325294 | A1 * | 10/2023 | Muthukrishnan | ... | G06F 11/3072 |
| | | | | | 709/224 |
| 2024/0129323 | A1 * | 4/2024 | Garyani | ................ | G06F 21/554 |
| 2024/0256997 | A1 * | 8/2024 | Harel | .................... | H04L 51/212 |
| 2024/0314161 | A1 * | 9/2024 | Schaaf | ................... | H04L 51/08 |
| 2025/0063064 | A1 * | 2/2025 | Schaaf | ................... | H04L 51/08 |

* cited by examiner

*Primary Examiner* — Oleg Survillo
(74) *Attorney, Agent, or Firm* — Holland & Hart, LLP.

(57)     ABSTRACT

A system supporting one or more machine learning models may receive, via a cloud-based platform that supports a multi-tenant system, metadata associated with a set of electronic communication messages for a tenant of the multi-tenant system. The system may normalize the metadata by extracting fields of the metadata into a format readable by the machine learning model to identify a set of fraudulent users associated with the set of electronic messages. The system may utilize the machine learning model to identify the set of fraudulent users based on executing a set of detection models and performing pattern matching between a set of previously authenticated user activity logs and a set of newly generated user activity logs in the metadata. Upon detection of the set of fraudulent users, the system may generate and transmit a report indicating the set of fraudulent users and the respective electronic message corresponding to the respective fraudulent user.

19 Claims, 12 Drawing Sheets

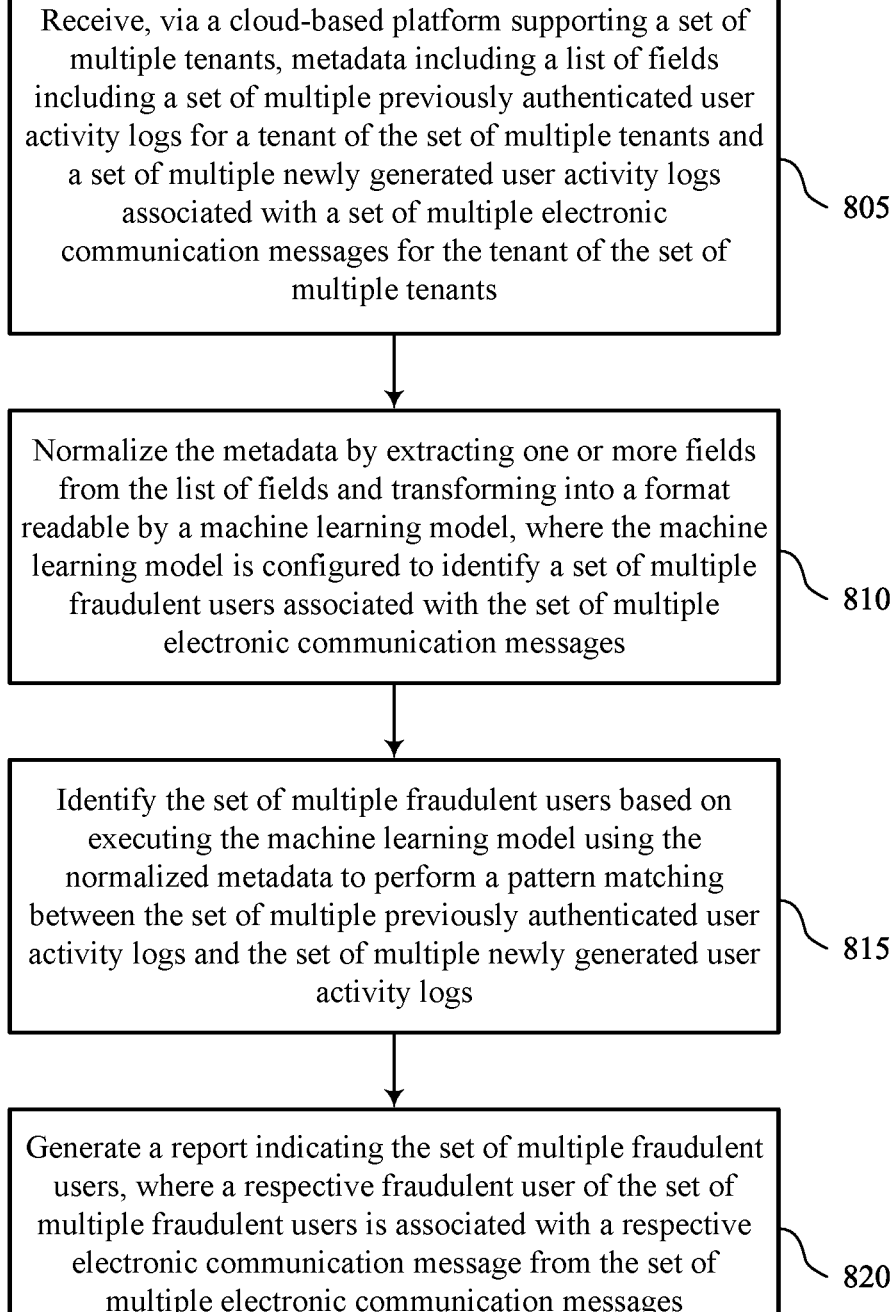

Receive, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants

805

Normalize the metadata by extracting one or more fields from the list of fields and transforming into a format readable by a machine learning model, where the machine learning model is configured to identify a set of multiple fraudulent users associated with the set of multiple electronic communication messages

810

Identify the set of multiple fraudulent users based on executing the machine learning model using the normalized metadata to perform a pattern matching between the set of multiple previously authenticated user activity logs and the set of multiple newly generated user activity logs

815

Generate a report indicating the set of multiple fraudulent users, where a respective fraudulent user of the set of multiple fraudulent users is associated with a respective electronic communication message from the set of multiple electronic communication messages

820

Figure 9:
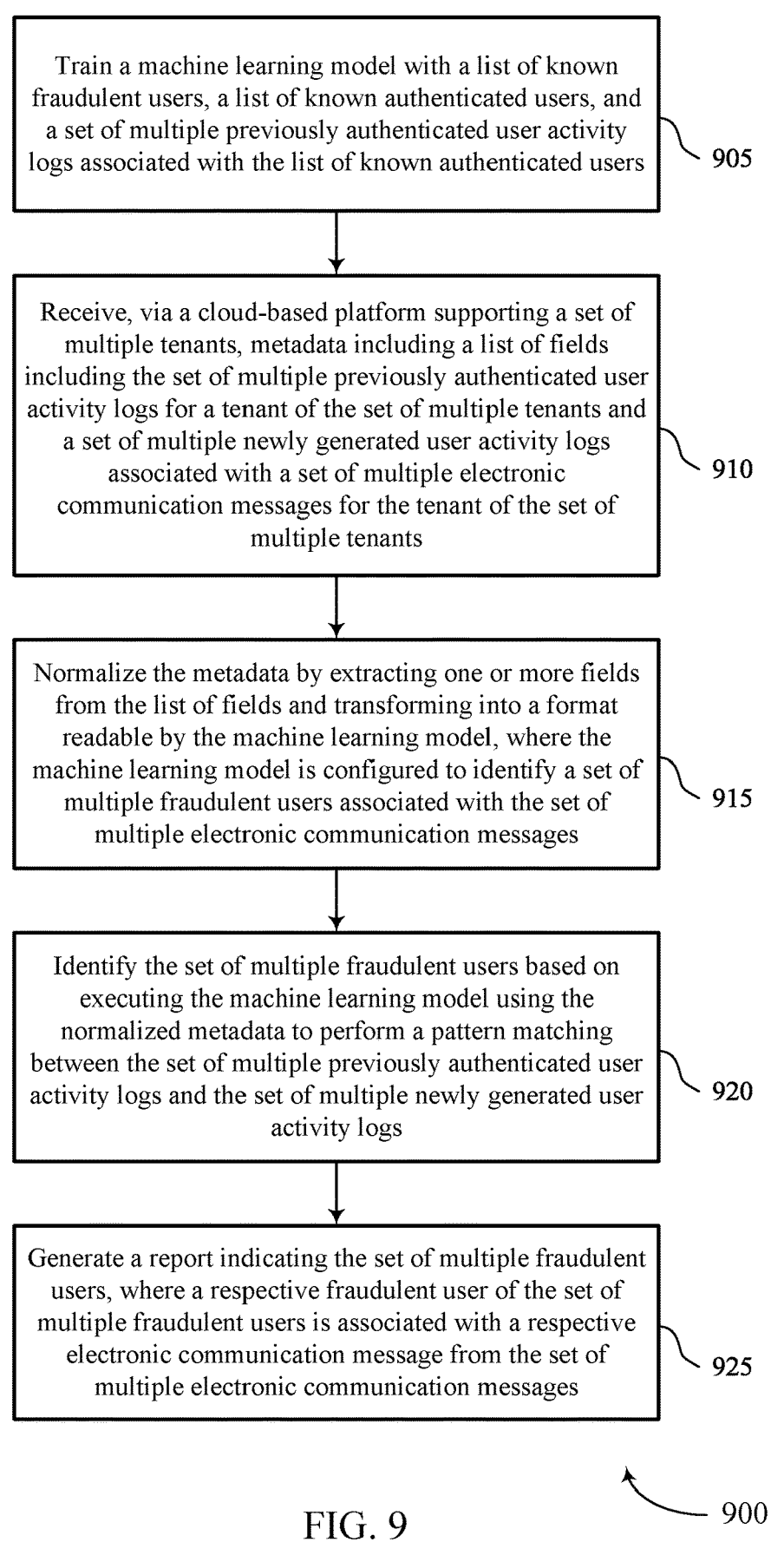

Train a machine learning model with a list of known fraudulent users, a list of known authenticated users, and a set of multiple previously authenticated user activity logs associated with the list of known authenticated users

905

Receive, via a cloud-based platform supporting a set of multiple tenants, metadata including a list of fields including the set of multiple previously authenticated user activity logs for a tenant of the set of multiple tenants and a set of multiple newly generated user activity logs associated with a set of multiple electronic communication messages for the tenant of the set of multiple tenants

910

Normalize the metadata by extracting one or more fields from the list of fields and transforming into a format readable by the machine learning model, where the machine learning model is configured to identify a set of multiple fraudulent users associated with the set of multiple electronic communication messages

915

Identify the set of multiple fraudulent users based on executing the machine learning model using the normalized metadata to perform a pattern matching between the set of multiple previously authenticated user activity logs and the set of multiple newly generated user activity logs

920

Generate a report indicating the set of multiple fraudulent users, where a respective fraudulent user of the set of multiple fraudulent users is associated with a respective electronic communication message from the set of multiple electronic communication messages

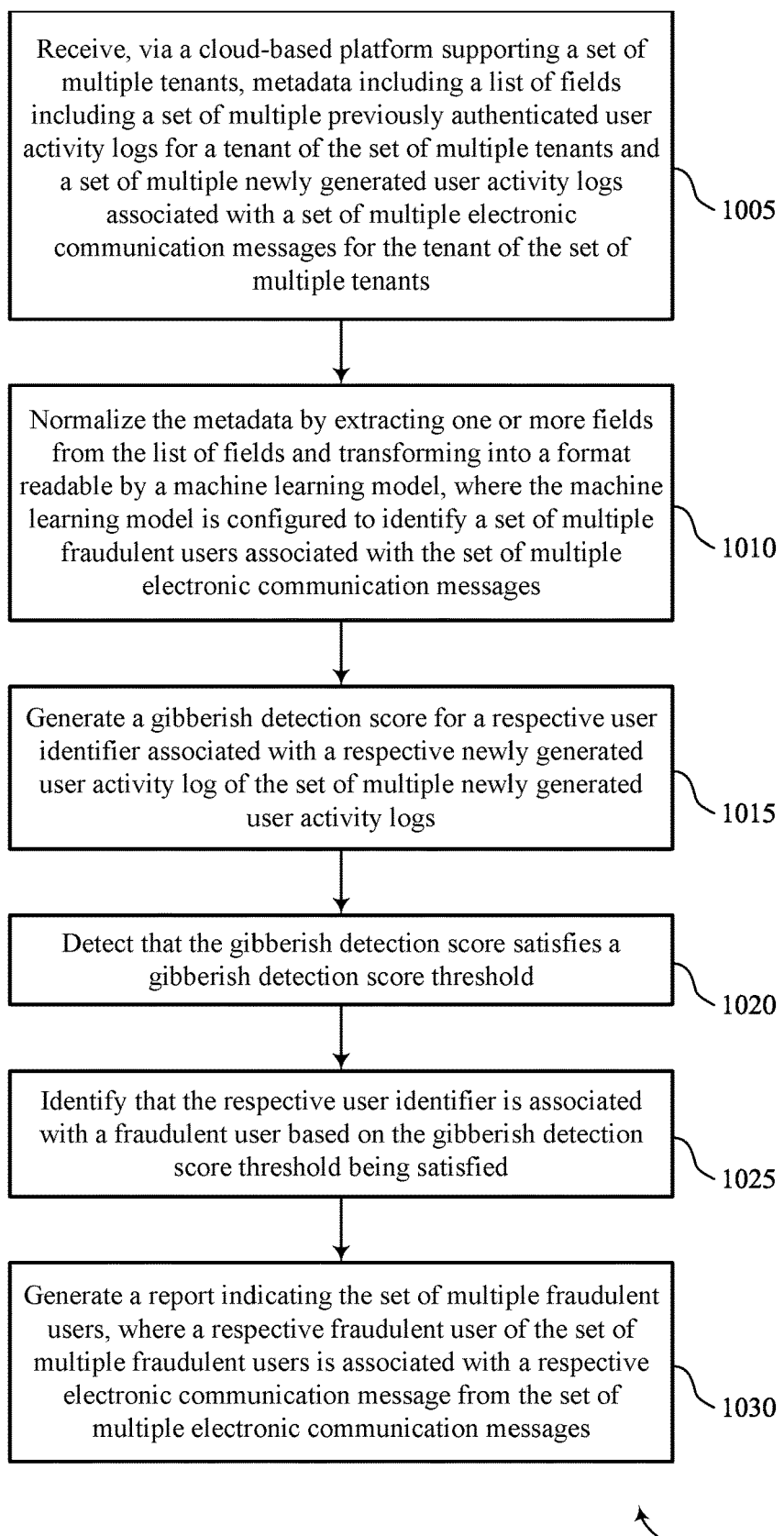

Receive, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants

1005

Normalize the metadata by extracting one or more fields from the list of fields and transforming into a format readable by a machine learning model, where the machine learning model is configured to identify a set of multiple fraudulent users associated with the set of multiple electronic communication messages

1010

Generate a gibberish detection score for a respective user identifier associated with a respective newly generated user activity log of the set of multiple newly generated user activity logs

1015

Detect that the gibberish detection score satisfies a gibberish detection score threshold

1020

Identify that the respective user identifier is associated with a fraudulent user based on the gibberish detection score threshold being satisfied

1025

Generate a report indicating the set of multiple fraudulent users, where a respective fraudulent user of the set of multiple fraudulent users is associated with a respective electronic communication message from the set of multiple electronic communication messages

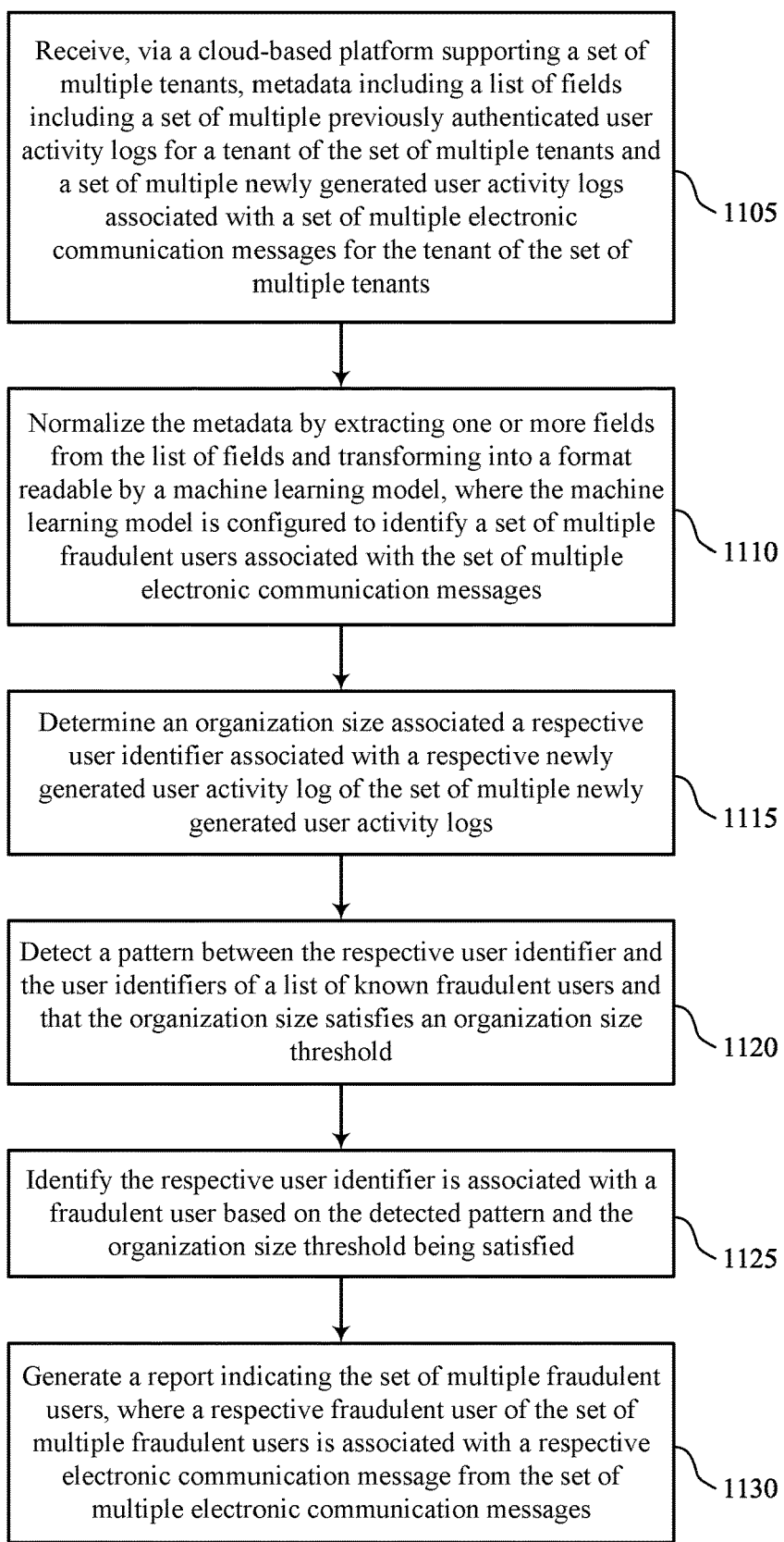

Receive, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants

1105

Normalize the metadata by extracting one or more fields from the list of fields and transforming into a format readable by a machine learning model, where the machine learning model is configured to identify a set of multiple fraudulent users associated with the set of multiple electronic communication messages

1110

Determine an organization size associated a respective user identifier associated with a respective newly generated user activity log of the set of multiple newly generated user activity logs

1115

Detect a pattern between the respective user identifier and the user identifiers of a list of known fraudulent users and that the organization size satisfies an organization size threshold

1120

Identify the respective user identifier is associated with a fraudulent user based on the detected pattern and the organization size threshold being satisfied

1125

Generate a report indicating the set of multiple fraudulent users, where a respective fraudulent user of the set of multiple fraudulent users is associated with a respective electronic communication message from the set of multiple electronic communication messages

Figure 12:
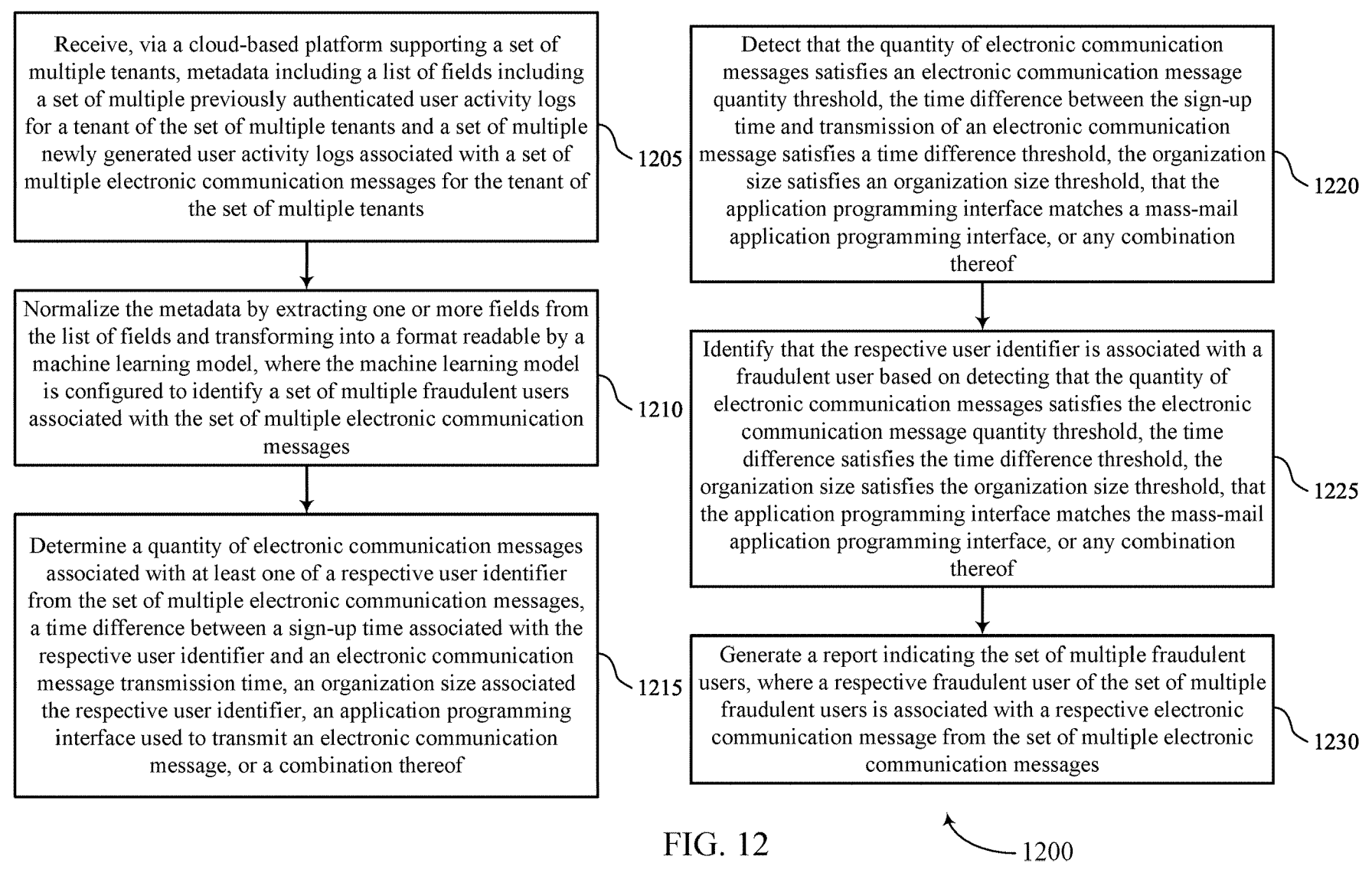

Receive, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants

1205

Normalize the metadata by extracting one or more fields from the list of fields and transforming into a format readable by a machine learning model, where the machine learning model is configured to identify a set of multiple fraudulent users associated with the set of multiple electronic communication messages

1210

Determine a quantity of electronic communication messages associated with at least one of a respective user identifier from the set of multiple electronic communication messages, a time difference between a sign-up time associated with the respective user identifier and an electronic communication message transmission time, an organization size associated with the respective user identifier, an application programming interface used to transmit an electronic communication message, or a combination thereof

1215

Detect that the quantity of electronic communication messages satisfies an electronic communication message quantity threshold, the time difference between the sign-up time and transmission of an electronic communication message satisfies a time difference threshold, the organization size satisfies an organization size threshold, that the application programming interface matches a mass-mail application programming interface, or any combination thereof

1220

Identify that the respective user identifier is associated with a fraudulent user based on detecting that the quantity of electronic communication messages satisfies the electronic communication message quantity threshold, the time difference satisfies the time difference threshold, the organization size satisfies the organization size threshold, that the application programming interface matches the mass-mail application programming interface, or any combination thereof

1225

Generate a report indicating the set of multiple fraudulent users, where a respective fraudulent user of the set of multiple fraudulent users is associated with a respective electronic communication message from the set of multiple electronic communication messages

CONTENT-OBLIVIOUS FRAUDULENT EMAIL DETECTION SYSTEM

FIELD OF TECHNOLOGY

The present disclosure relates generally to database systems and data processing, and more specifically to content-oblivious fraudulent email detection system.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, users may frequently receive spam and phishing email messages in an attempt to steal data and information and gain access into secure systems. Spam messages may be messages sent to a large number of users and may have dangerous content linked inside the message, such as computer viruses. Phishing messages may be messages where someone (a person sending the message) pretends to be a person, brand, or user, that a user may trust (e.g., a fraudulent user pretending to be an authentic user). In some examples, the fraudulent user may attempt to have a user give up personal or confidential information. To prevent such emails from causing harm to users, some programs may be deployed and the contents of emails (e.g., email subject line, email body text) may be scanned for text indicative of a spam or phishing email. However, allowing such programs access to contents of user's emails may prove to be a security risk if the program stores personal, private, or confidential data or uses the data to train such programs.

BRIEF DESCRIPTION OF THE DRAWINGS

FIGS. 8 through 12 show flowcharts illustrating methods that support content-oblivious fraudulent email detection system in accordance with aspects of the present disclosure.

DETAILED DESCRIPTION

Figure 1:
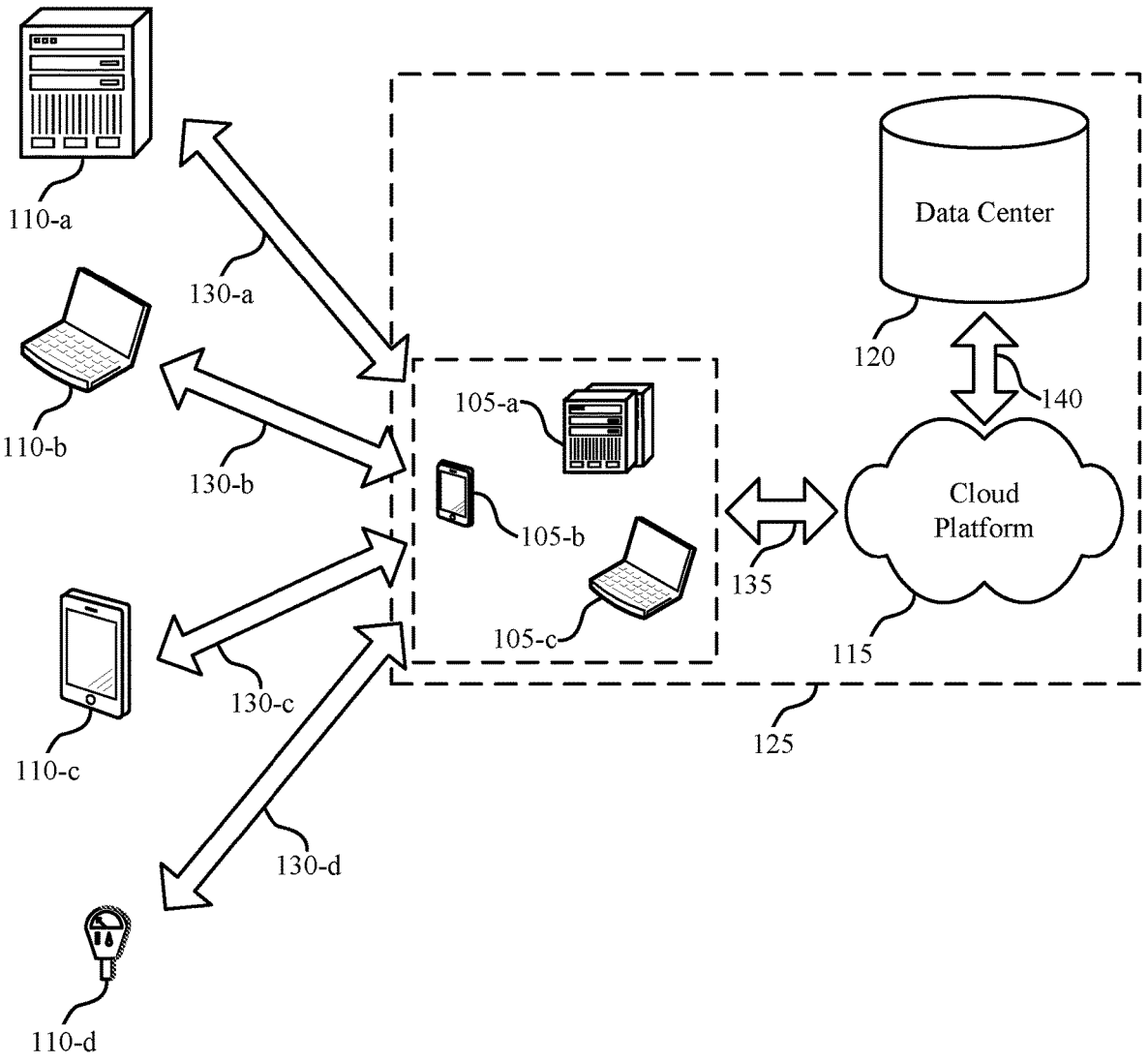
FIG. 1 illustrates an example of a data processing system that supports content-oblivious fraudulent email detection system in accordance with aspects of the present disclosure.

In some examples, tenants in a multi-tenant based system may frequently receive spam and phishing electronic messages or electronic communication mail (e.g., email, text messages, instant messaging messages) attempting to steal data and information and gain access into secure systems. Spam and phishing emails may cause reputation damages to reputable people and brands as well as cause financial damages to users. In some examples, such a system may detect phishing and spam emails via natural language processing (NLP) techniques, where the system may scan the contents and subjects of emails and run them through machine learning models. For example, a system may identify spam emails by learning from the text of user's emails and classifying messages as spam and non-spam. However, training and implementing of such machine learning models may be very time consuming and computationally inefficient in detecting spam and phishing emails. Additionally, such machine learning models may rely on access to the content of emails (e.g., the subject line, the email body text), which may present a security risk as the contents of emails may include personal, private, or other confidential information. Although, if the contents of an email are not available for training, such machine learning models may not be able to detect if an email is a spam or phishing email.

The techniques of the present disclosure describe training and implementing a machine learning model that uses metadata to identify potentially fraudulent users. In particular, the metadata may include a list of fields associated with a set of previously authenticated user activity logs for a tenant of a multi-tenant based system and for a set of newly generated user activity logs for a tenant of a multi-tenant based system. The machine learning model may use the activity logs associated with a set of emails to detect if an email is a spam or phishing email. For instance, the machine learning model uses the metadata instead of using the contents of an email. The machine learning model may receive or identify the raw metadata of a set of emails, normalize the metadata by extracting fields of the metadata and transform the metadata into a format readable by the machine learning model. The machine learning model may then perform a detection process to detect a fraudulent user (e.g., user that sent the spam or phishing email), and generate a report of the fraudulent users detected by the machine learning model. Such detections may be more computationally efficient, may comply with data privacy regulations, and may be resilient in changing environments as to not rely on frequent retraining.

In some cases, the execution of the machine learning model may include the execution of a bulk sign-up detection model, an impersonation detection model, and a mass mail detection model to detect a fraudulent user. In operation of such detection models, the metadata of the emails may include usernames, sign-up times, organization sizes, along with other information. The detection models may perform pattern matching between the set of previously generated user activity logs and newly generated user activity logs and the machine learning model may normalize the metadata into a tabular format which may provide an easier format for the machine learning model to read and use. Additionally, or alternatively, the machine learning model and the corresponding detection models may be trained with both a list of known fraudulent and known authentic users to enhance the detection of fraudulent users from the metadata of emails.

Aspects of the disclosure are initially described in the context of an environment supporting an on-demand database service. Additional aspects of the disclosure are described with reference to a workflow, a machine learning model diagram, and a process flow. Aspects of the disclosure are further illustrated by and described with reference to apparatus diagrams, system diagrams, and flowcharts that relate to content-oblivious fraudulent email detection system.

FIG. 1 illustrates an example of a system 100 for cloud computing that supports content-oblivious fraudulent email detection system in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-$a$), a smartphone (e.g., cloud client 105-$b$), or a laptop (e.g., cloud client 105-$c$). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-$a$, 130-$b$, 130-$c$, and 130-$d$). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-$a$), a laptop (e.g., contact 110-$b$), a smartphone (e.g., contact 110-$c$), or a sensor (e.g., contact 110-$d$). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples of the system 100, tenants in a multi-tenant based system may receive spam and phishing electronic communication messages or electronic mail (email) attempting to steal data and information and gain access into secure systems. Spam and phishing emails may cause reputation damages to reputable people and brands as well as financial damages to users. In some systems, such phishing and spam emails may be detected via NLP techniques, where the contents and subjects of emails may be scanned and run through machine learning models. However, training and implementing of such machine learning models may be very time consuming and computationally inefficient to use in detecting spam and phishing emails. Additionally, such models may rely on access to the content of emails (e.g., the subject line, the email body text), which may present a security risk as the contents of emails may include personal, private, or other confidential information. If the contents of an email are not available to the model, such machine learning models may not be able to detect if an email is a spam or phishing email.

To provide a more secure and efficient technique of detecting spam and phishing emails, the system 100 may train and implement a machine learning model using metadata of emails, instead of using the contents of an email. The machine learning model may receive or identify the raw metadata of a set of emails from the cloud platform 115, normalize the metadata by extracting fields of the metadata into a format readable by the machine learning model (e.g., a tabular format), perform a detection process to detect a fraudulent user (e.g., user that sent the spam or phishing email), and generate a report of the fraudulent users detected by the machine learning model. In some cases, the execution of the machine learning model may include execution of a bulk sign-up detection model, an impersonation detection model, and a mass mail detection model, to detect a fraudulent user. Further, to support operation of such detection models, the metadata of the emails may include usernames, sign-up times, organization sizes, along with other information. Such detection models may be more computationally efficient, may comply with data privacy regulations, and may be resilient in changing environments as to not rely on frequent retraining. Thus, the techniques depicted herein provide for a method of detecting email abuse including spamming, phishing, and providing phishing-as-a-service to downstream fraudsters. Additionally, or alternatively, the techniques depicted herein provide for a method for detecting impersonations combining platform specific behaviors and entity characteristics without requiring inspection of content, and a method for categorizing deviations from prioritized representative organizations toward detection of abuse from a service provider perspective without requiring inspection of content. Additionally, or alternatively, the techniques depicted herein provide for categorizing bulk-signups without resorting to data or other compute-intensive approaches that does not rely on retraining across alternate languages.

For example, as the machine learning model is used more often the machine learning model may learn and further train on data collected during operation. As such, the machine learning model may operate more efficiently as more fraudulent users are detected. For example, if a user receives an email from an unknown source, the cloud platform 115 may send the email through the machine learning model for detection. The machine learning model may use the metadata of the email along with the data of known fraudulent users and patterns learned from detecting previous fraudulent users to detect if the unknown source may be a fraudulent user. If the unknown source is detected to be a fraudulent user, the machine learning model may learn from the patterns presented in the metadata of that email and the cloud platform 115 may prevent the user from receiving the email entirely. Further, if the machine learning model detects that the unknown source is an authentic user, such user may be added to a list of authentic users to allow any subsequent emails to bypass the detection models, therefore reducing the processing power associated with running the machine learning model. As such, the operation of the machine learning model may improve the user experience by providing a safer and more secure way of receiving emails.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
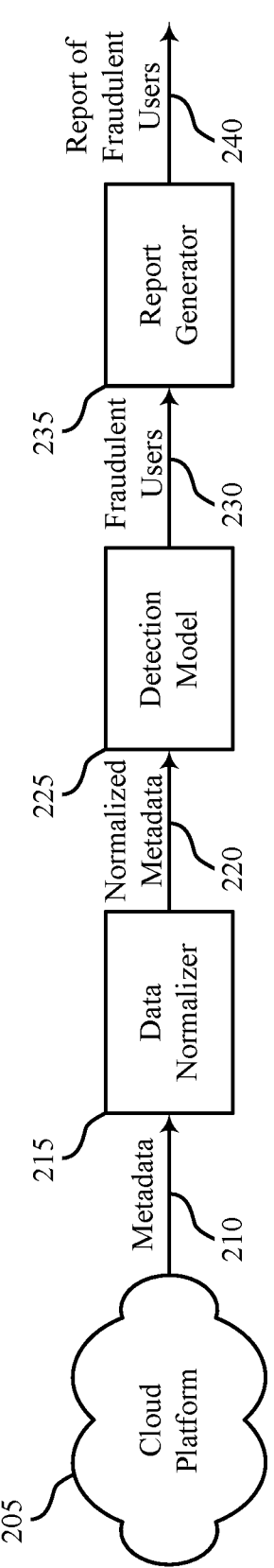
FIG. 2 shows an example of a workflow that supports content-oblivious fraudulent email detection system in accordance with aspects of the present disclosure.
Figure 2:

FIG. 2 shows an example of a workflow 200 that supports content-oblivious fraudulent email detection system in accordance with aspects of the present disclosure. In some examples, the workflow 200 may be implemented by the system 100. The workflow may include a cloud platform 205, a data normalizer 215, a detection model 225, and a report generator 235. In some examples, the cloud platform 205 may be an example of the cloud platform 115 with reference to FIG. 1. Further, the workflow 200 may be executed or may be ran on devices described herein with reference to FIG. 1. For example, the workflow 200 may be executed or run on cloud clients 105 or contacts 110 described with reference to FIG. 1.

In some examples, the cloud platform 205 may receive emails for tenants of a multi-tenant system, which may be spam or phishing emails. Phishing and/or spam may include an abuse of an email service via bulk sign-ups, which may include fraudulent users signing up for a relatively large amount of email accounts (e.g., more than 1,000) within a relatively short amount of time (e.g., less than a minute). Additionally, or alternatively, phishing and/or spam may include abuse of the email service via impersonation techniques, where the fraudulent users may impersonate legitimate businesses, brands, or companies. In some cases, when a relatively large amount of spam or phishing emails are sent out to a relatively large amount of users, the sending of the spam or phishing emails may be referred to as a spam campaign or phishing campaign. For example, a fraudulent user may send out 1,000 identical emails to 1,000 different users, impersonating a reputable brand. In some examples, such emails may include language stating that the recipient had won a prize and the recipient must pay for shipping in order to receive the prize. However, the website the email directs the user to may have been edited so that the fraudulent user may steal a user's credit card information using an inline frame (iFrame). An iFrame may be used in a hypertext markup language (HTML) document to embed interactive media (e.g., login pages, pages to enter shipping addresses or payment information). As such, the website may have an iFrame that may be transparent to a user, and on the page where the user enters their credit card information, the iFrame may be overlapping so that the user may actually be providing their credit card information to the fraudulent user instead of the reputable brand that the fraudulent user may be impersonating. In such examples, the fraudulent user may have some advance technological knowledge to operate such spam or phishing campaigns.

In some examples, phishing may occur as a result of phishing as a service where a software as a service business provides access to a phishing kit in exchange for a monetary fee. Phishing as a service business may be able to register extremely large quantity of email accounts (e.g., upwards of ten thousand) per day and then subsequently sell them to phishers for a profit. In some cases, to leverage advances features from paid accounts (e.g., paid email accounts), fraudulent users may use fake or stolen credit cards, debit cards, or pre-paid cards as payment methods. Such payment methods may be canceled or fail to process, and as such the payments for these paid accounts may not be able to be collected which may result in a relatively large financial loss (e.g., thousands or millions of dollars) for the service providers providing service for such paid accounts. Additionally, or alternatively, phishing or spam emails may also result in reputational damage for companies as their accounts may be associated with large amounts of fraud and spam, resulting in further financial loss due to the reputation damage. As such, fraudulent users who may lack the skill or knowledge of creating and initializing a spam or phishing campaign may use phishing as a service businesses to have another user generate the spam or phishing campaign for them, thus increasing the quantity of users who may have access to operating a spam or phishing campaign.

Addressing and preventing such fraudulent abuse of email services may be challenging. In particular, as email service abuse techniques become more advanced, email service providers may become aware of the large financial losses caused by such techniques. In some examples, NLP models may be used to detect phishing and spam emails and classify the emails as spam or non-spam. NLP models may be types of machine learning models which are trained to recognize patterns and relationships in text. For example, NLP models may look for spelling mistakes in an email (e.g., email subject line or email body) and based on a quantity of spelling mistakes in the email exceeding a threshold, the NLP model may flag the email as suspicious and potentially a phishing or spam email. Therefore, such NLP detection models may rely on access to the contents of the emails to detect patterns in the text. Additionally, or alternatively, the NLP detection models may learn from reading emails and learn new patterns that may be related to phishing or spam emails.

However, due to regulations on data privacy (e.g., general data protection regulation (GDPR), Children's Online Privacy Protection Act (COPPA)) service providers may have limited visibility of the content of emails (e.g., subject line text, body text, account owner, internet protocol (IP) address) for tenants in a multi-tenant system. Further, in some cases, service providers may store personal identifiable information (PII) (e.g., email address, account holder name) in separate systems than the system that may receive and store emails as a method of security management. As such, obtaining such information and using such information to report which users may be fraudulent users may be difficult. Therefore, service providers may be unable to use such NLP detection models as the email contents may be hidden from the service provider, which may make it difficult to validate or detect fraudulent emails. Additionally, or alternatively, it may be relatively easy for fraudulent users to bypass NLP detection models. For example, fraudulent users may recognize how phishing email or spam email may be detected and may change the language of the email contents to avoid detection. As such, the service provider may have to train the NLP model more frequently to prevent spam and phishing campaigns from going undetected which may be time consuming and may use a relatively large amount of processing power. Further, the NLP detection models may have trouble detecting phishing as a service and impersonation phishing attacks and fraudulent users may recognize such issues to avoid detection.

As such, to more effectively detect phishing and spam emails, the techniques of the present disclosure describe a content-oblivious fraudulent email detection system where the metadata 210 of emails may be used to detect fraudulent emails and thus detect the fraudulent users without any inspection of the email contents. The system's processes may be represented by the workflow 200. For example, the cloud platform 205 may receive emails from unknown sources and may extract the metadata 210 to be normalized by the data normalizer 215. The metadata 210 may include previously generated user activity logs (e.g., previously authenticated user activity information) and newly generated user activity logs that may be used to detect user behaviors and entities. In some cases, the metadata 210 may include fields of the user activity logs (e.g., outbound emails, login activities, sign-up activities, or any combination thereof).

The data normalizer 215 may transform the metadata 210 into a format readable by the machine learning model (e.g., a tabular format). The data normalizer 215 may parse through the raw data of the metadata 210 and extract the fields into a structured data set that may be consumed by the machine learning model. In some examples, such structured data set may be in a tabular format where the columns may correspond to the fields of the metadata 210. The data normalizer 215 may then send the normalized metadata 220 to the detection model 225. In some cases, the detection model 225 may be referred to as a machine learning model. The detection model 225 may examine the normalized metadata 220 and run one or more of three separate detection models 225 concurrently. For example, the detection model 225 may include a bulk sign-up detection model, an impersonation detection model, and a mass mail detection model. Such detection models 225 may operate concurrently using the normalized metadata 220 and may detect fraudulent users 230 based on at least one of the detection models 225 detecting a user as fraudulent.

Further, the detection model 225 may indicate the fraudulent users 230 to the report generator 235. The report generator 235 may generate a tabular report of the detected fraudulent users 230 where the columns of the report of fraudulent users 240 may be associated with the columns of the tabular format normalized metadata 220 (e.g., the fields of the metadata 210). The report of fraudulent users 240 may be sent to system administrators of an email service provider to examine and block such detected fraudulent users 230 from using their email service (e.g., deactivate accounts).

As such, the workflow 200 of the multi-tenant based system described herein may provide for a more computationally efficient and accurate process in detecting spam and phishing emails. The process may be more computationally efficient as the detection models 225 may operate concurrently and the detection models 225 may use a relatively small training set, therefore saving time and processing power when initially training the detection models 225. Further, the detection system may also be used to detect phishing as a service uses which if detected may be able to prevent a greater quantity of phishing users. Additionally, or alternatively, as the detection system may be content-oblivious (e.g., refrains from inspecting the content of emails), the detection system may comply with data privacy regulations. In some cases, the detection system may also be more resilient to the changing environments as the detection system may not rely on frequent training, therefore allowing the detection system to have a high level of accuracy and being able to prevent phishing campaigns from becoming large scale and impacting large amounts of users. Additionally, or alternatively, the detection system may detect and categorize deviations from known authentic users and organizations while refraining from inspecting the content of emails, which may allow for a service provider to better and more securely support such organizations. Further descriptions of the detection system and the different detection models 225 may be described herein with reference to FIG. 3.

Figure 3:
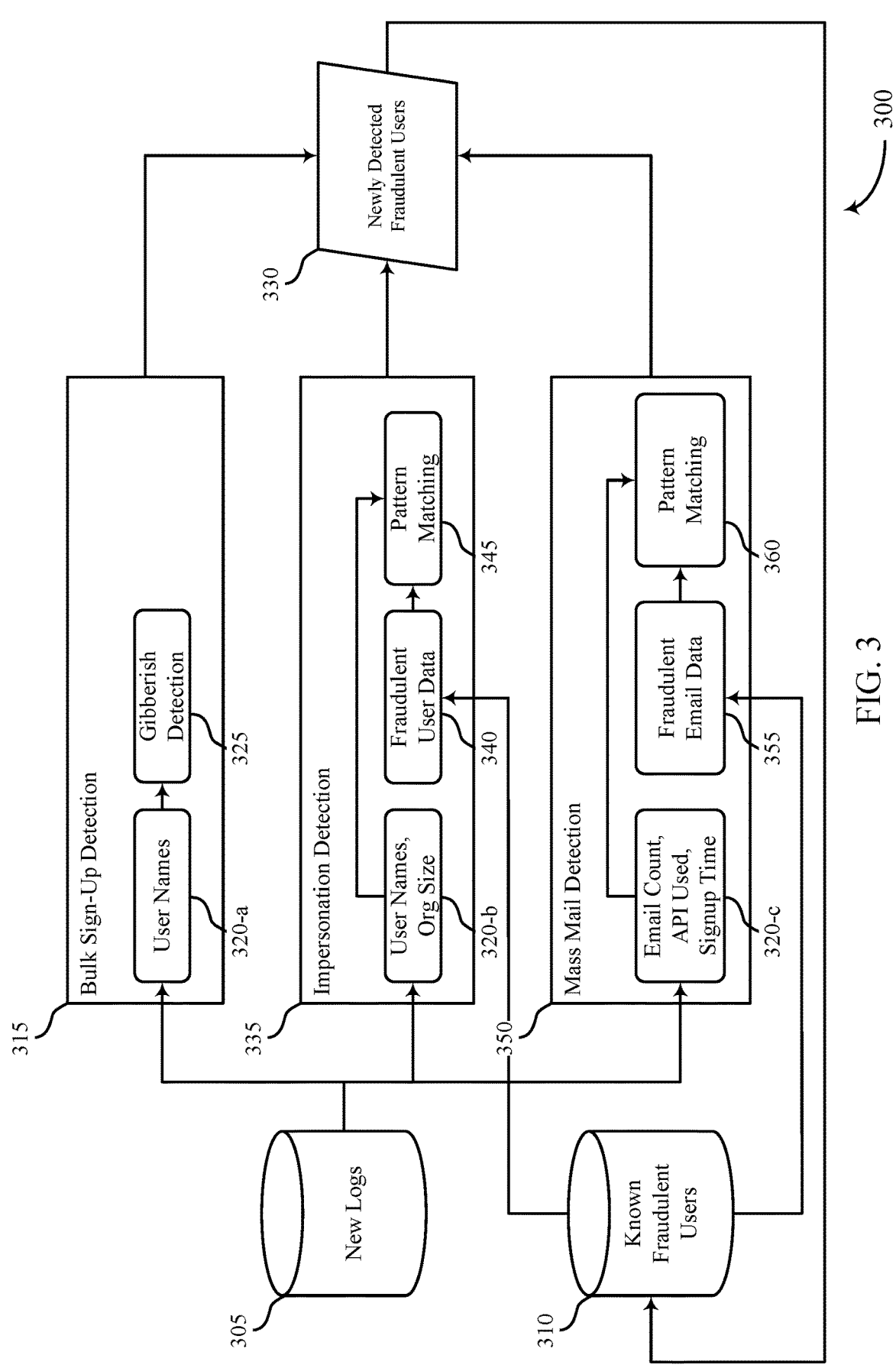
FIG. 3 shows an example of a machine learning model diagram that supports content-oblivious fraudulent email detection system in accordance with aspects of the present disclosure.

FIG. 3 shows an example of a machine learning model diagram 300 that supports content-oblivious fraudulent email detection system in accordance with aspects of the present disclosure. In some examples, the machine learning model diagram 300 may be implemented by the system 100. In some cases, the machine learning model diagram 300 may describe a machine learning model that may execute the workflow 200 or a machine learning model that may be implemented by the workflow 200.

As depicted herein, a machine learning model may be implemented to identify and subsequently report fraudulent activities and/or fraudulent users. As a user receives emails, the machine learning model may extract the metadata of the new logs 305. The new logs 305 may be examples of user activity logs with sets of fields. The machine learning model may normalize the new logs 305 before performing any processing using the new logs. In some cases, the normalization technique may manipulate the data of the new logs from a relatively long string or list of fields and data into a format consumable and readable by the machine learning model (e.g., a tabular format). The normalization process may be described elsewhere here with reference to the data normalizer 215 described in FIG. 2. Further, once normalized, the machine learning model may provide the normalized metadata of the new logs 305 as an input to one or more detection models of the machine learning model (e.g., a bulk sign-up detection model 315, an impersonation detection model 335, and a mass mail detection model 350). Additionally, or alternatively, the machine learning model may be trained with a list of known fraudulent users 310 and a list of known authentic users. The list of known fraudulent users 310 may train the machine learning model, and thus the detection models, on what may be indicative of a fraudulent user. As such, to perform such initial detection of patterns, the machine learning model may compare the list of known fraudulent users 310 to the list of known authentic users and detect differences between the lists. Such differences in pattern may be used as a baseline for the detection of fraudulent users, and the machine learning model may learn further differences by running the detection models using the new logs 305.

One of the detection models of the machine learning model may be the bulk sign-up detection model 315. Fraudulent users (such as, phishers or spammers) may use bulk sign-ups for spam and phishing emails and campaigns by generating random organization names and therefore signing up a relatively large amount (e.g., more than 1,000) in a relatively short time (e.g., less than a minute). The fraudulent users may use scripts to generate completely random organization names that are full of gibberish (e.g., a series of characters that have no meaning in any language). For example, for phishing as a service, fraudulent users may generate relatively large amounts of accounts to then sell to other fraudulent users for phishing campaigns.

As such, the bulk sign-up detection model 315 may extract specific fields 320-*a* of the normalized metadata for running the detection model (e.g., usernames of the new logs 305). The bulk sign-up detection model 315 may extract the usernames included in the fields 320-*a* from the new logs 305 and may perform gibberish detection 325 on them and generate a gibberish score. Gibberish detection may be used in bulk sign-up which gives a gibberish score based on how random the username is, and a higher score may mean that the username is more random. The bulk sign-up detection model 315 may use an N-gram NLP model for the gibberish detection 325. The bulk sign-up detection model 315 may use the N-gram NLP model in a nonstandard way which allows for detection without resorting to data- or compute-intensive approaches and does not rely on retraining across alternate languages. An N-gram model may be an NLP model that looks at the sequence of N terms (e.g., words, charterers, letters, symbols) and predicts the probability of a next term based on the occurrence of the N–1 term. The N may represent a quantity of terms that may be grouped together where, if N=1, each term may be considered independently, and if N=2, two terms may be grouped together at a time. For example, a sentence may say "I am going to the" and the N-gram model may be N=2 where two words may be grouped together at a time (e.g., "I am," "am going," "going to," "to the") and the N-gram model may attempt to predict the next word. The N-gram model may generate multiple predictions and their corresponding probabilities. In some examples, the N-gram model may predict the next word in the sentence "I am going to the" may be "store" or "car" or "doctor" or other similar words, and the N-gram model may assign a probability score for each of the words. As such, words that represent places may have higher probability scores than words that representing items, as placing a word like "cup" or "triangle" may not make sense in the context of the sentence. An N-gram model may be more efficient than most NLP techniques as the model may be trained across multiple different languages and may use a relatively low amount of computation resources.

For the gibberish detection 325, the terms may be characters in a username of an unknown user in the new logs 305. The gibberish detection 325 may use an N-gram model where N=4 and may group four characters together at a time. For example, a username may be "johnsmith" and each character may be grouped together by fours (e.g., "john," "ohns," "hnsm," "nsmi," "smit," and "mith"). Thus the gibberish detection 325 may look at the permutations of characters and combinations of such permutations and compare them to trained data to determine if such permutation combinations represent actual words. The training data for the N-gram model may include a relatively small corpus of text data (e.g., 11 megabytes (Mb) per language) and the gibberish detection 325 may compare the permutation combinations of the username to the training data and generate a gibberish score based on the detection. In some cases, if the gibberish detection 325 generates a gibberish score above a gibberish score threshold (e.g., greater than or equal to 1.25) the gibberish detection 325 may classify username as gibberish, and the bulk sign-up detection model 315 may classify a user associated with the username as a fraudulent user which may be added to a list of newly detected fraudulent users 330. Further, the bulk sign-up detection model 315 may allow for a more efficient detection of phishing as a service and may detect such accounts before they are sold and used in phishing campaigns. The bulk sign-up detection model 315 may also be relatively computationally efficient as the machine learning model may use a relatively low amount of data to train the bulk sign-up detection model 315. Additionally, or alternatively, the bulk sign-up detection model 315 may be able to be used in contexts that may be unable to support machine learning models (e.g., search engines).

As depicted in the example of FIG. 3, another detection model used, in conjunction with the bulk sign-up detection model 315, may be the impersonation detection model 335. Impersonation may occur with phishing emails as a way for a fraudulent user to gain trust of a user and get the user to give up sensitive, personal, private, or confidential information. For example, the fraudulent user may pretend to be a well-known brand or company and may email a user saying that your payment method has expired or failed and gives a link for the user to select (e.g., click on) to update their payment method. Such a link may actually lead the user to a dangerous website that looks almost identical to the real company or brand's website. The dangerous website may ask the user to enter their username and password as well as their credit or debit card information. In some cases, the interactive text boxes used to enter such information may appear as if they are normal text boxes and they are being used to access your account or edit details of your account, however, the fraudulent user may have embedded a program to intercept such text and may store it for their own use later. For example, the fraudulent user may have a database of stolen information and may associate the stolen information by the email address of a user. In some other examples, impersonation may be used in phishing emails to get users to transfer money into fraudulent accounts. For example, a fraudulent user may pretend to be a relative or a coworker and may ask the user to input an amount of money into an account for them for a seemingly legitimate purpose. However, such account may steal such money and may further steal any payment or bank information given to attempt to steal larger amounts of money at a different time. To prevent a fraudulent user from being successful in such attacks against tenants of the multi-tenant system, the impersonation detection model 335 may be executed by combining signals from multiple angles to identify impersonation attacks including organization names, organization sizes, and known top targets.

The impersonation detection model 335 may extract specific fields 320-*b* of the normalized metadata for running the detection model (e.g., usernames and the organization size of users in the new logs 305). The impersonation detection model 335 may determine the organization size based on the quantity of users associated with a specific business or company. For example, a well-known and reputable brand or company may have a relatively large quantity of users (e.g., 500 or more users) and a fraudulent user may have a relatively low quantity of users associated with their "brand" or "company name" (e.g., less than 100 users). As such, for each username in the new logs 305, the impersonation detection model 335 may compare the organization size to an organization size threshold. If the organization size of a user is below the organization size threshold (e.g., size is less than 50 users), the impersonation detection model 335 may flag the user and/or their organization as potentially fraudulent.

Further, the impersonation detection model 335 may extract fields from the list of known fraudulent users 310 to obtain fraudulent user data 340. The fraudulent user data 340) may include the organization names used by fraudulent users. The impersonation detection model 335 may use the fraudulent user data 340 to identify historical data associated with known top targets. Such top targets may be extremely well known organizations, brands, or companies, that have been previously frequently impersonated. For example, a well-known company called "ABC Solutions" having an organization name of "abcsolutions" may have been used in previous phishing attacks. As such, the impersonation detection model 335 may use the fields 320-*b* of the normalized metadata and the fraudulent user data 340 for pattern matching 345. The pattern matching 345 may compare the organization names from the fields 320-*b* of the normalized metadata to the organization names of known fraudulent users from the fraudulent user data 340 as well as the organization names of previously authenticated users and organizations (e.g., authentic organizations).

The pattern matching 345 of the impersonation detection model may use regular expressions to determine if an organization name from the fields 320-*b* is a fraudulent organization. For example, if an authentic organization name is "abcsolutions" the pattern matching 345 may use regular expressions to detect any differences from the authentic organization name. Regular expressions may be a sequence of characters or pattern that the pattern matching 345 may be trained to detect. For example, a fraudulent organization name may be "abcsolutions1" or "abcsollutions," where the fraudulent name may be relatively similar to the authentic organization name. As such, the regular expressions may be configured to detect any users with organization names with extra characters compared to the authentic organization name or detect organization names with digits or characters following the authentic organization name. The pattern matching 345 may apply the regular expressions on the organization names from the extracted fields 320-*b*, and may compare the organization names from the extracted fields 320-*b* to the organization names of known authentic users and to the fraudulent user data 340 from list of known fraudulent users 310. To detect a user as a fraudulent user, the impersonation detection model 335 may look at both the organization size and the pattern matching 345 as an "AND" function where a fraudulent user may be detected if both the organization threshold is exceeded and if there is a match in the pattern matching 345. Upon detecting a fraudulent user, the username as a fraudulent user which may be added to a list of newly detected fraudulent users 330.

Further, in conjunction with both the bulk sign-up detection model 315 and the impersonation detection model 335, another detection model used may be the mass mail detection model 350. Mass mail may be when a user sends out a relatively large quantity of emails or messages (e.g., more than 1,000) all at once or within a relatively short amount of time (e.g., less than a minute). For example, a fraudulent user may send out a relatively large quantity of emails in an effort to increase the chance of success. That is, as the fraudulent users sends a relatively large quantity of emails at a relatively fast rate, the potential financial gain of phishing campaigns for the fraudulent users may increase.

The mass mail detection model 350 may be designed to detect when a fraudulent user sends a relatively large quantity of emails within a relatively short amount of time to therefore decrease the chance of success of a phishing campaign of the fraudulent user. The mass mail detection model 350) may extract specific fields 320-*c* of the normalized metadata for running the mass mail detection model 350 (e.g., email count, API used, organization size, or sign-up time). In cases where a fraudulent user sends out a relatively large quantity of emails, the email count for a given time (e.g., a minute) of sent emails (e.g., outbound email count) of a user may exceed an email quantity threshold within a threshold amount of time. For example, the email quantity threshold may be 1,000 emails and the threshold amount of time may be one minute, therefore if a user sends over 1,000 emails within a minute or less, the mass mail detection model 350 may flag the user as a fraudulent user or potential fraudulent user. In some cases, the quantity of emails sent may be determined by an API used to send the emails.

When sending emails there may be different types of APIs used to send emails (e.g., a single mail API and a mass mail API). Users may use the single mail API send individual emails and users may use the mass mail API to send a relatively large quantity of emails at the same time or within a short period of time. In some examples, if a fraudulent user sends the mass quantity of emails using the single mail API, the mass mail detection model 350 may detect that the quantity of emails based on the quantity of API requests or API pushes. However, if the fraudulent user uses the mass mail API, it may be difficult to determine whether the mass email was sent by a fraudulent user or by an authenticated user. For example, companies may send mass emails to all their employees using the mass mail API, which may be a valid use of the mass mail API. As such, the mass mail detection model 350 may also look at the sign-up time of the user.

The sign-up time of a user may be the time at which an account was created. The new logs 305 may store the exact timestamp of when a given account was created (e.g., the month, day, and year, and the hour, minute, and second of creation). The mass mail detection model 350 may compare the timestamp of when a user sends the mass quantity of emails are sent to the sign-up time of the email account and if the time difference is below a threshold time difference (e.g., three days) the user may be flagged as a fraudulent user. For example, if a user sends a mass quantity of emails within three days of the creation of the account, the user may be flagged as a fraudulent user.

Additionally, or alternatively, the mass mail detection model 350 may also use the organization size to detect fraudulent users, in a similar manner as described with reference to the impersonation detection model 335. In some cases, the mass mail detection model 350) may also compare the quantity of emails sent (e.g., the outbound email count) to the organization size of the user. For example, a user with an organization size of 5,000 sending an email to 1,000 people may be an authentic use of sending out a mass email, however, a user with an organization of ten people sending an email to 1,000 people may be flagged as a fraudulent user. In some cases, the difference may be compared to a threshold quantity of emails based on the organization size. The threshold quantity may be configured by the mass mail detection model 350. In some cases, the threshold quantity may be equivalent to the organization size. That is the mass mail detection model 350 may determine that users sending an email to their entire organization may be a legitimate use of sending a mass email. However, if a user sends an email to twice the amount of people than in their organization, the user may be flagged as a fraudulent user.

In some examples, the mass mail detection model 350 may use the specific fields 320-*c* of the new logs 305 and fraudulent email data 355 of the list of known fraudulent users 310 to perform pattern matching 360. For example, the mass mail detection model 350 may compare the email count of a new email to the email count of a known fraudulent user in the fraudulent email data 355. The fraudulent email data 355 may be the average data between all fraudulent users in the list of known fraudulent users 310. For example, the fraudulent email count of the fraudulent email data 355 may be an average between the email counts of all fraudulent users in the list of known fraudulent users 310. As such, the mass mail detection model 350 may compare such averages in the fraudulent email data 355 to the data of the new logs 305 to detect a fraudulent user. In some cases, if any pattern is detected as a match in the pattern matching 360, the mass mail detection model 350 may flag the user as a fraudulent user and the username as a fraudulent user which may be added to a list of newly detected fraudulent users 330.

Once the machine learning model completes the processing of the new logs 305 the list of newly detected fraudulent users 330 may be added to the list of known fraudulent users 310 and the list of newly detected fraudulent users 330 may be emptied accordingly. In such cases, the machine learning model may identify a user as a fraudulent user if at least one of the detection models (e.g., the bulk sign-up detection model 315, the impersonation detection model 335, or the mass mail detection model 350) detects a user as a fraudulent user. As such, the machine learning model may execute the detection models concurrently and run the detection using an "OR" function where a flag from at least one detection model may be used to determine a user as a fraudulent user to then add to the list of newly detected fraudulent users 330. Such operation may allow for a more resource and time efficient technique and a more secure technique of detecting fraudulent users. Once the machine learning model has processed all the new logs 305, the machine learning model may generate a report of all the fraudulent users and send the report to a system administrator for deactivation of such accounts or the machine learning model may execute the process of deactivation of such accounts on its own. Further description of such procedures of detecting and reporting fraudulent users using the techniques described herein may be described with reference to FIG. 4.

Figure 4:
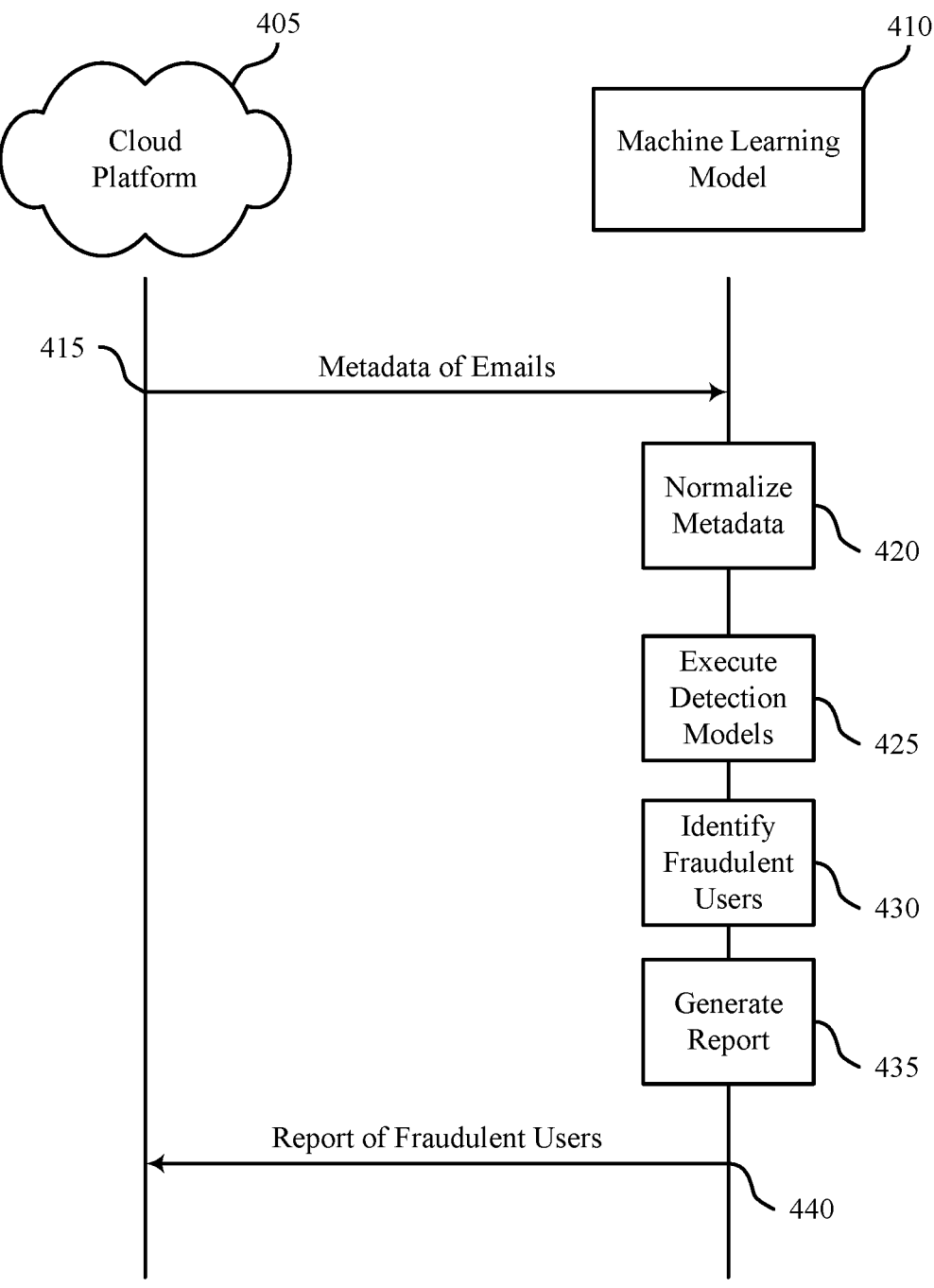
FIG. 4 shows an example of a process flow that supports content-oblivious fraudulent email detection system in accordance with aspects of the present disclosure.

FIG. 4 shows an example of a process flow 400 that supports content-oblivious fraudulent email detection system in accordance with aspects of the present disclosure. In some examples, the process flow 400 may be implemented by the system 100. The process flow 400 may include a cloud platform 405 and a machine learning model 410 (e.g., implemented by a system, as described herein) which may be examples of devices or systems described elsewhere herein with reference to FIGS. 1-3. In the following description of the process flow 400, the operations between the cloud platform 405 and the machine learning model 410 may be performed in different orders or at different times. Some operations may also be left out of the process flow 400, or other operations may be added. Although the cloud platform 405 and the machine learning model 410 are shown performing the operations of the process flow 400, some aspects of some operations may also be performed devices or services.

At 415, machine learning model 410 may receive, via the cloud platform 405 that supports a set of tenants, metadata associated with electronic messages (e.g., emails) for the tenants of the set of tenants. The metadata may include a list of fields including a set of previously authenticated user activity logs of a tenant of the set of tenants and a set of newly generated user activity logs associated with the electronic messages for the tenants of the set of tenants. In some cases, the list of fields in the metadata for a respective newly generated user activity log of the set of newly generated user activity logs may include at least one of a username, an organization size, a sign-up date, or any combination thereof. In some examples, prior to receiving the metadata, the machine learning model 410 may be trained with a list of known fraudulent users, a list of known authenticated users, and a set of previously authenticated user activity logs associated with the list of known authentic users.

At 420, the machine learning model 410 may normalize the metadata by extracting one or more fields from the list of fields and transform the metadata into a format readable and consumable by the machine learning model 410. Using the normalized metadata, the machine learning model 410 may be configured to identify a set of fraudulent users associated with the electronic communication messages. In some cases, the machine learning model 410 may extract the one or more fields of each electronic communication message into a tabular format, where the columns of the tabular format may be the extracted one or more fields.

At 425, the machine learning model 410 may execute a set of detection models using the normalized metadata to perform a pattern matching between the set of previously authenticated user activity logs and the set of newly generated user activity logs and identify the set of fraudulent users. The set of detection models may run concurrently for each electronic communication message and a fraudulent user may be detected if at least one detection model flags a user as a fraudulent user. Such detection models include a bulk sign-up detection model, an impersonation detection model, and a mass mail detection model.

The bulk sign-up detection model may include generating a gibberish detection score for a user ID for a respective newly generated user activity log of the set of newly generated user activity logs. In some cases, the machine learning model 410 may detect that the gibberish detection score satisfies (e.g., is above) a gibberish detection score threshold. In such cases, the machine learning model 410 may identify the corresponding user as a fraudulent user based on the gibberish detection score being satisfied.

The impersonation detection model may determine an organization size for a user ID and look for a pattern between the user ID and user IDs from the list of known fraudulent users. In some cases, the machine learning model 410 may detect a pattern between the user ID and the user IDs from the list of known fraudulent users and that the organization size of the user satisfies (e.g., is below) an organization size threshold. Based on the pattern being detected and the organization size threshold being satisfied, the machine learning model 410 may identify the corresponding user as a fraudulent user.

The mass-mail detection model may determine a quantity of electronic communication messages for a user ID, a time difference between a sign-up time and a transmission time of an electronic communication message for the user ID, an organization size for the user ID, the API used by the user of the user ID to transmit an electronic communication message, or any combination thereof. In some cases, the machine learning model 410 may detect that the quantity of electronic communication messages satisfies (e.g., is above) an electronic communication message quantity threshold, the time difference satisfies (e.g., is below) a time difference threshold, the AP used matches a mass-mail API, or any combination thereof. In some examples, based on one or more of the threshold being detected to be satisfied, the API matching the mass-mail API, or any combination thereof, the machine learning model 410 may identify the corresponding user as a fraudulent user.

At 430, the machine learning model 410 may identify the set of fraudulent users based on executing the detection models at 425 for the electronic communication messages in the received metadata. At 435, the machine learning model 410) may generate a report indicating the set of fraudulent users and at 440 transmit the report to the cloud platform. In the report, each respective fraudulent user may be associated with at least one of the electronic communication messages in the metadata. In some examples, the report of fraudulent users may include an organization ID, a user ID, an organization name, a creation date, or any combination thereof, for each fraudulent user of the set of fraudulent users.

Figure 5:
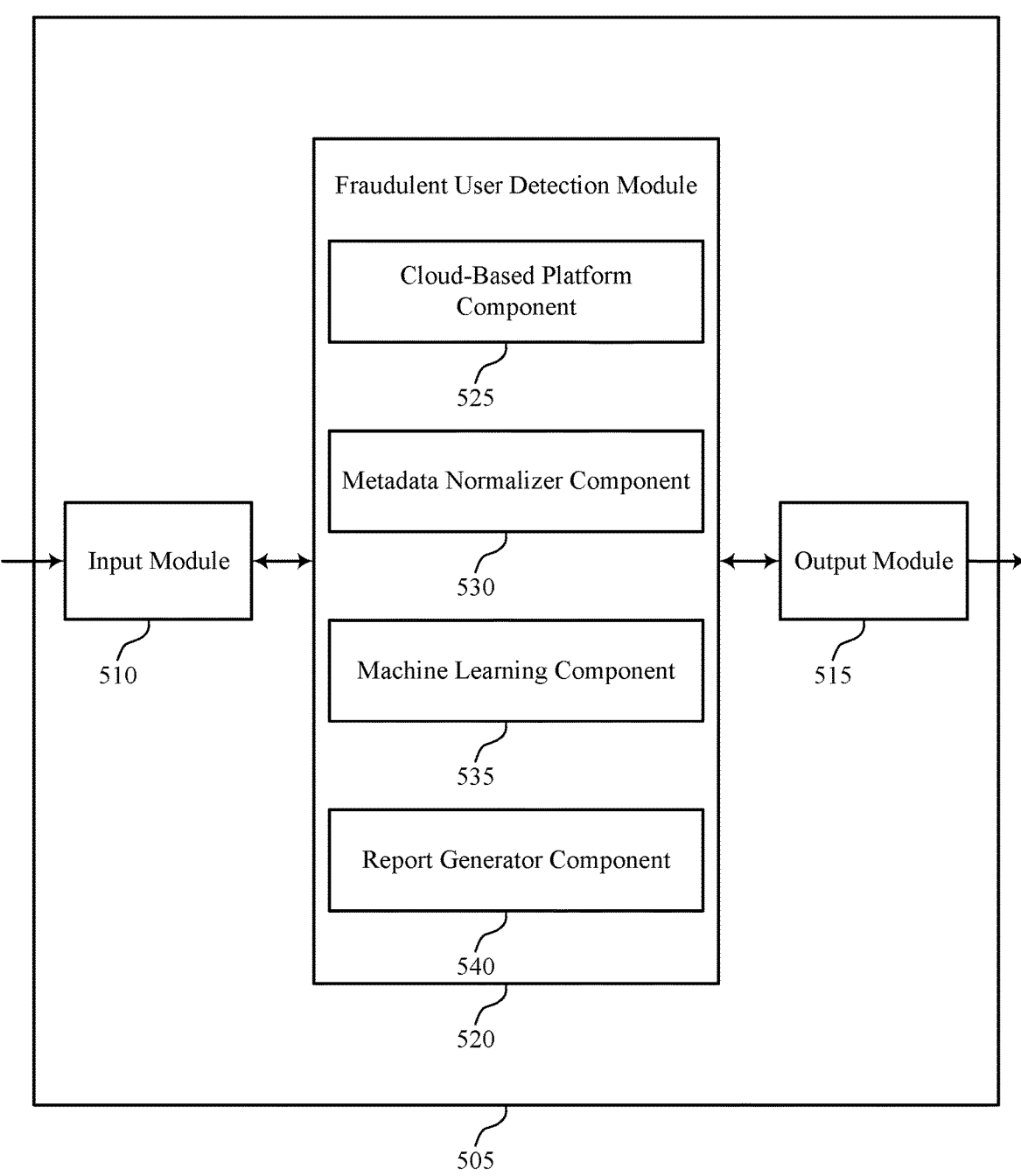
FIG. 5 shows a block diagram of an apparatus that supports content-oblivious fraudulent email detection system in accordance with aspects of the present disclosure.

FIG. 5 shows a block diagram 500 of a device 505 that supports content-oblivious fraudulent email detection system in accordance with aspects of the present disclosure. The device 505 may include an input module 510, an output module 515, and a fraudulent user detection module 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the fraudulent user detection module 520 to support content-oblivious fraudulent email detection system. In some cases, the input module 510 may be a component of an I/O controller 710 as described with reference to FIG. 7.

The output module 515 may manage output signals for the device 505. For example, the output module 515 may receive signals from other components of the device 505, such as the fraudulent user detection module 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the fraudulent user detection module 520 may include a cloud-based platform component 525, a metadata normalizer component 530, a machine learning component 535, a report generator component 540, or any combination thereof. In some examples, the fraudulent user detection module 520, or various components thereof, may be configured to perform various operations (e.g., receiving, monitoring, transmitting) using or otherwise in cooperation with the input module 510, the output module 515, or both. For example, the fraudulent user detection module 520 may receive information from the input module 510, send information to the output module 515, or be integrated in combination with the input module 510, the output module 515, or both to receive information, transmit information, or perform various other operations as described herein.

The fraudulent user detection module 520 may support data processing in accordance with examples as disclosed herein. The cloud-based platform component 525 may be configured to support receiving, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants. The metadata normalizer component 530 may be configured to support normalizing the metadata by extracting one or more fields from the list of fields and transforming into a format readable by a machine learning model, where the machine learning model is configured to identify a set of multiple fraudulent users associated with the set of multiple electronic communication messages. The machine learning component 535 may be configured to support identifying the set of multiple fraudulent users based on executing the machine learning model using the normalized metadata to perform a pattern matching between the set of multiple previously authenticated user activity logs and the set of multiple newly generated user activity logs. The report generator component 540) may be configured to support generating a report indicating the set of multiple fraudulent users, where a respective fraudulent user of the set of multiple fraudulent users is associated with a respective electronic communication message from the set of multiple electronic communication messages.

Figure 6:
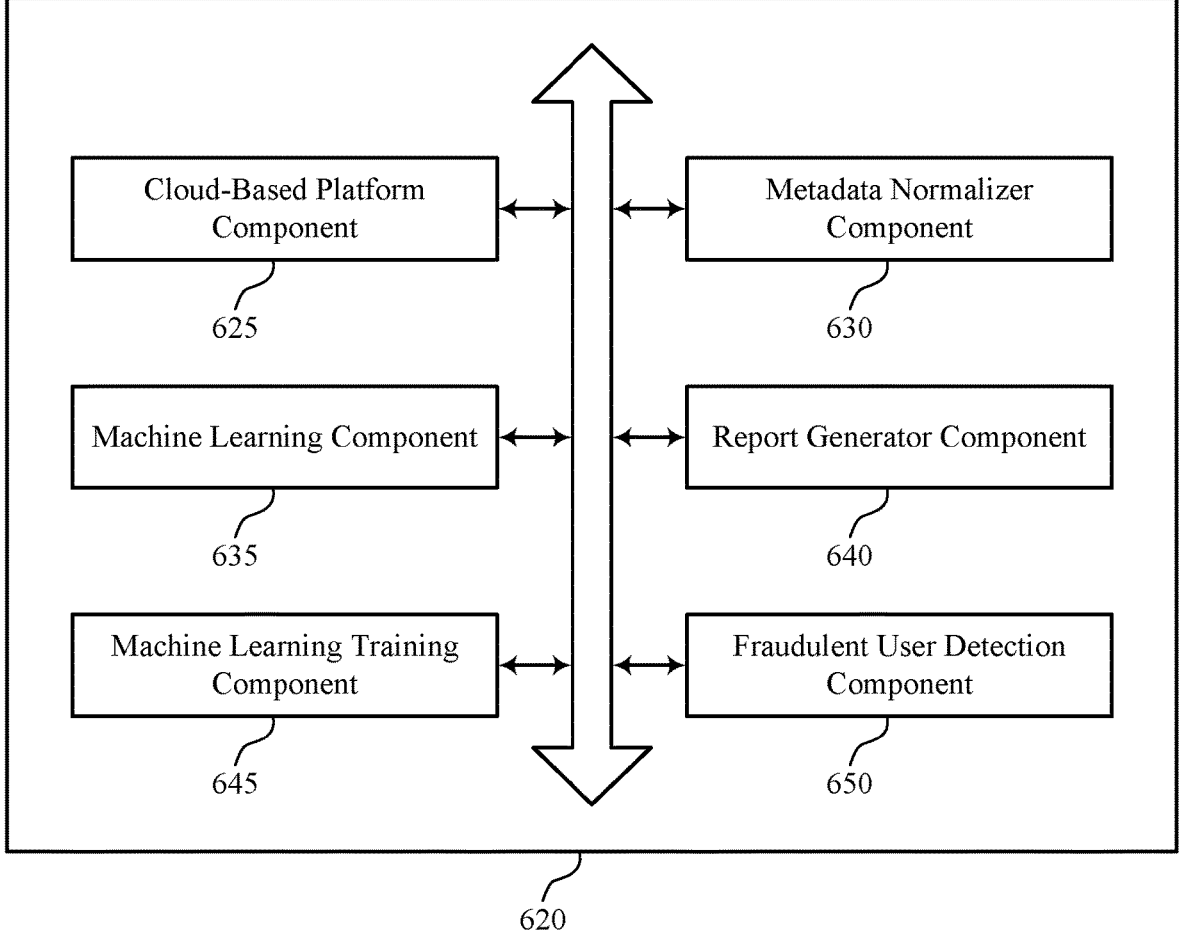
FIG. 6 shows a block diagram of a fraudulent user detection module that supports content-oblivious fraudulent email detection system in accordance with aspects of the present disclosure.

FIG. 6 shows a block diagram 600 of a fraudulent user detection module 620 that supports content-oblivious fraudulent email detection system in accordance with aspects of the present disclosure. The fraudulent user detection module 620 may be an example of aspects of a fraudulent user detection module or a fraudulent user detection module 520, or both, as described herein. The fraudulent user detection module 620, or various components thereof, may be an example of means for performing various aspects of content-oblivious fraudulent email detection system as described herein. For example, the fraudulent user detection module 620 may include a cloud-based platform component 625, a metadata normalizer component 630, a machine learning component 635, a report generator component 640, a machine learning training component 645, a fraudulent user detection component 650, or any combination thereof. Each of these components may communicate, directly or indirectly, with one another (e.g., via one or more buses).

The fraudulent user detection module 620 may support data processing in accordance with examples as disclosed herein. The cloud-based platform component 625 may be configured to support receiving, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants. The metadata normalizer component 630 may be configured to support normalizing the metadata by extracting one or more fields from the list of fields and transforming into a format readable by a machine learning model, where the machine learning model is configured to identify a set of multiple fraudulent users associated with the set of multiple electronic communication messages. The machine learning component 635 may be configured to support identifying the set of multiple fraudulent users based on executing the machine learning model using the normalized metadata to perform a pattern matching between the set of multiple previously authenticated user activity logs and the set of multiple newly generated user activity logs. The report generator component 640 may be configured to support generating a report indicating the set of multiple fraudulent users, where a respective fraudulent user of the set of multiple fraudulent users is associated with a respective electronic communication message from the set of multiple electronic communication messages.

In some examples, the machine learning training component 645 may be configured to support training the machine learning model with a list of known fraudulent users, a list of known authenticated users, and the set of multiple previously authenticated user activity logs associated with the list of known authenticated users.

In some examples, to support executing the machine learning model, the machine learning component 635 may be configured to support executing a set of multiple detection models using the normalized metadata to identify the set of multiple fraudulent users, where the set of multiple detection models are configured to run concurrently for each electronic communication message of the set of multiple electronic communication messages.

In some examples, a fraudulent user is detected if at least one detection model of the set of multiple detection models identifies a user of a respective electronic communication message of the set of multiple electronic communication messages as a fraudulent user.

In some examples, to support executing the set of multiple detection models, the fraudulent user detection component 650 may be configured to support executing one or more of a bulk sign up detection model, an impersonation detection model, a mass-mail detection model, or a combination thereof.

In some examples, to support executing the bulk sign up detection model, the fraudulent user detection component

650 may be configured to support generating a gibberish detection score for a respective user identifier associated with a respective newly generated user activity log of the set of multiple newly generated user activity logs. In some examples, to support executing the bulk sign up detection model, the fraudulent user detection component 650 may be configured to support detecting that the gibberish detection score satisfies a gibberish detection score threshold. In some examples, to support executing the bulk sign up detection model, the fraudulent user detection component 650 may be configured to support identifying that the respective user identifier is associated with a fraudulent user based on the gibberish detection score threshold being satisfied.

In some examples, to support executing the mass-mail detection model, the fraudulent user detection component 650 may be configured as or otherwise support a means for determining a quantity of electronic communication messages associated with at least one of a respective user identifier from the set of multiple electronic communication messages, a time difference between a sign-up time associated with the respective user identifier and an electronic communication message transmission time, an organization size associated the respective user identifier, an application programming interface used to transmit an electronic communication message, or a combination thereof. In some examples, to support executing the mass-mail detection model, the fraudulent user detection component 650 may be configured as or otherwise support a means for detecting that the quantity of electronic communication messages satisfies an electronic communication message quantity threshold, the time difference between the sign-up time and transmission of an electronic communication message satisfies a time difference threshold, the organization size satisfies an organization size threshold, that the application programming interface matches a mass-mail application programming interface, or any combination thereof. In some examples, to support executing the mass-mail detection model, the fraudulent user detection component 650 may be configured as or otherwise support a means for identifying that the respective user identifier is associated with a fraudulent user based on detecting that the quantity of electronic communication messages satisfies the electronic communication message quantity threshold, the time difference satisfies the time difference threshold, the organization size satisfies the organization size threshold, that the application programming interface matches the mass-mail application programming interface, or any combination thereof.

In some examples, to support executing the mass-mail detection model, the fraudulent user detection component 650 may be configured to support determining a quantity of electronic communication messages associated with at least one of a respective user identifier from the set of multiple electronic communication messages, a time difference between a sign-up time associated with the respective user identifier and an electronic communication message transmission time, an organization size associated the respective user identifier, an application programming interface used to transmit an electronic communication message, or a combination thereof. In some examples, to support executing the mass-mail detection model, the fraudulent user detection component 650 may be configured to support detecting that the quantity of electronic communication messages satisfies an electronic communication message quantity threshold, the time difference between the sign-up time and transmission of an electronic communication message satisfies a time difference threshold, the organization size satisfies an organization size threshold, that the application programming interface matches a mass-mail application programming interface, or any combination thereof. In some examples, to support executing the mass-mail detection model, the fraudulent user detection component 650 may be configured to support identifying that the respective user identifier is associated with a fraudulent user based on detecting that the quantity of electronic communication messages satisfies the electronic communication message quantity threshold, the time difference satisfies the time difference threshold, the organization size satisfies the organization size threshold, that the application programming interface matches the mass-mail application programming interface, or any combination thereof.

In some examples, to support normalizing the metadata, the metadata normalizer component 630 may be configured to support extracting the one or more fields from each respective electronic communication message of the set of multiple electronic communication messages into a tabular format.

In some examples, a set of multiple columns of the tabular format for the normalized metadata are associated with the list of fields in the metadata. In some examples, the list of fields in the metadata for a respective newly generated user activity log of the set of multiple newly generated user activity logs include at least one of a username, an organization size, a sign-up date, or any combination thereof. In some examples, the report indicating the set of multiple fraudulent users includes at least one of an organization identifier, a user identifier, an associated organization name, a creation date, or any combination thereof.

Figure 7:
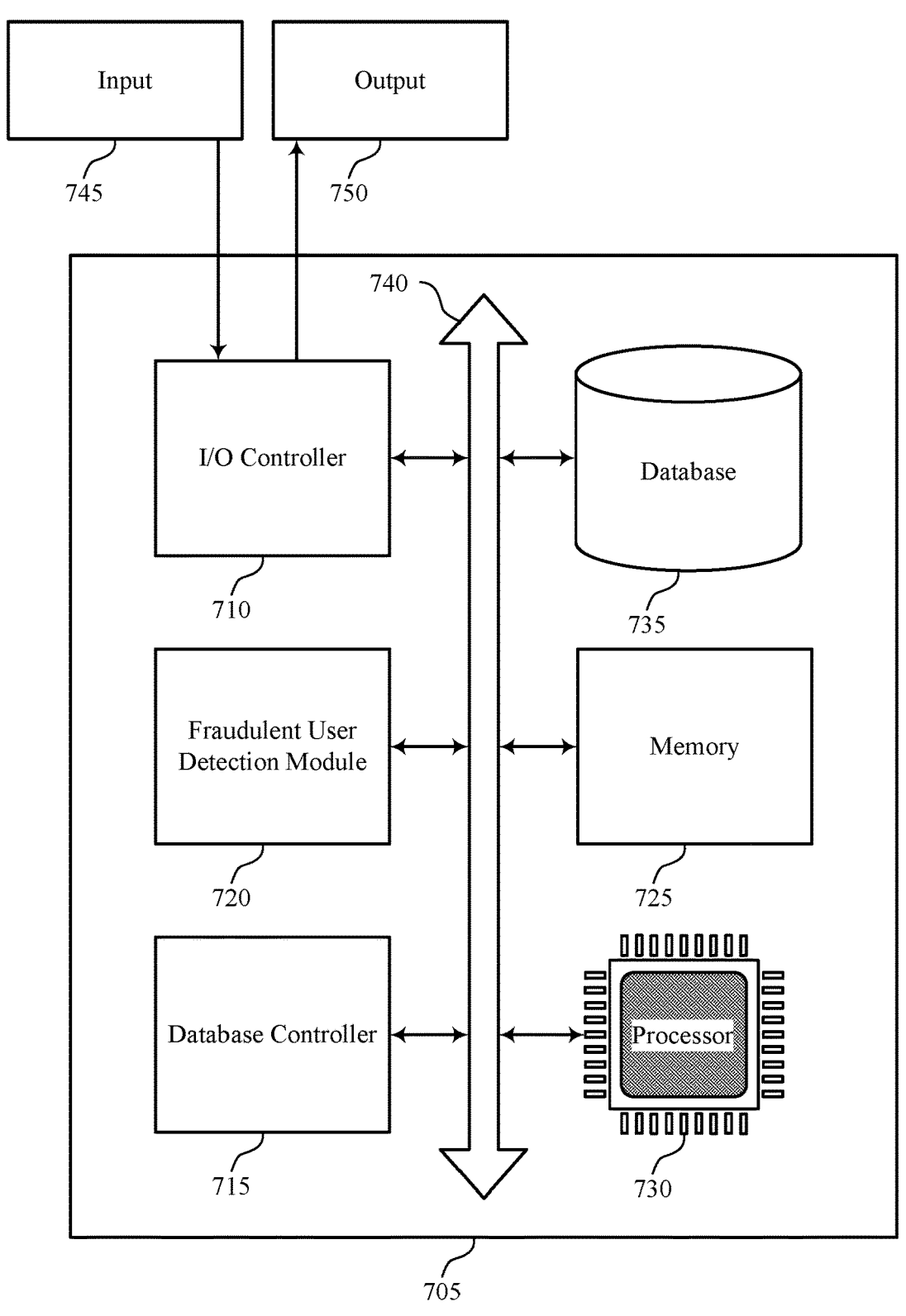
FIG. 7 shows a diagram of a system including a device that supports content-oblivious fraudulent email detection system in accordance with aspects of the present disclosure.

FIG. 7 shows a diagram of a system 700 including a device 705 that supports content-oblivious fraudulent email detection system in accordance with aspects of the present disclosure. The device 705 may be an example of or include the components of a device 505 as described herein. The device 705 may include components for bi-directional data communications including components for transmitting and receiving communications, such as a fraudulent user detection module 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting content-oblivious fraudulent email detection system).

The fraudulent user detection module 720 may support data processing in accordance with examples as disclosed herein. For example, the fraudulent user detection module 720 may be configured to support receiving, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants. The fraudulent user detection module 720 may be configured to support normalizing the metadata by extracting one or more fields from the list of fields and transforming into a format readable by a machine learning model, where the machine learning model is configured to identify a set of multiple fraudulent users associated with the set of multiple electronic communication messages. The fraudulent user detection module 720 may be configured to support identifying the set of multiple fraudulent users based on executing the machine learning model using the normalized metadata to perform a pattern matching between the set of multiple previously authenticated user activity logs and the set of multiple newly generated user activity logs. The fraudulent user detection module 720 may be configured to support generating a report indicating the set of multiple fraudulent users, where a respective fraudulent user of the set of multiple fraudulent users is associated with a respective electronic communication message from the set of multiple electronic communication messages.

By including or configuring the fraudulent user detection module 720 in accordance with examples as described herein, the device 705 may support techniques for detecting fraudulent emails in a content-oblivious manner for an improved communication reliability, improved user experience related to reduced processing, and improved security of communications.

FIG. 8 shows a flowchart illustrating a method 800 that supports content-oblivious fraudulent email detection system in accordance with aspects of the present disclosure. The operations of the method 800 may be implemented by a fraudulent email detection service or its components as described herein. For example, the operations of the method 800 may be performed by a fraudulent email detection service as described with reference to FIGS. 1 through 7. In some examples, a fraudulent email detection service may execute a set of instructions to control the functional elements of the wireless fraudulent email detection service to perform the described functions. Additionally, or alternatively, the wireless fraudulent email detection service may perform aspects of the described functions using special-purpose hardware.

At 805, the method may include receiving, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants. The operations of 805 may be performed in accordance with examples as disclosed herein. In some examples, aspects of the operations of 805 may be performed by a cloud-based platform component 625 as described with reference to FIG. 6.

At 810, the method may include normalizing the metadata by extracting one or more fields from the list of fields and transforming into a format readable by a machine learning model, where the machine learning model is configured to identify a set of multiple fraudulent users associated with the set of multiple electronic communication messages. The operations of 810 may be performed in accordance with examples as disclosed herein. In some examples, aspects of the operations of 810 may be performed by a metadata normalizer component 630 as described with reference to FIG. 6.

At 815, the method may include identifying the set of multiple fraudulent users based on executing the machine learning model using the normalized metadata to perform a pattern matching between the set of multiple previously authenticated user activity logs and the set of multiple newly generated user activity logs. The operations of 815 may be performed in accordance with examples as disclosed herein. In some examples, aspects of the operations of 815 may be performed by a machine learning component 635 as described with reference to FIG. 6.

At 820, the method may include generating a report indicating the set of multiple fraudulent users, where a respective fraudulent user of the set of multiple fraudulent users is associated with a respective electronic communication message from the set of multiple electronic communication messages. The operations of 820 may be performed in accordance with examples as disclosed herein. In some examples, aspects of the operations of 820 may be performed by a report generator component 640 as described with reference to FIG. 6.

FIG. 9 shows a flowchart illustrating a method 900 that supports content-oblivious fraudulent email detection system in accordance with aspects of the present disclosure. The operations of the method 900 may be implemented by a fraudulent email detection service or its components as described herein. For example, the operations of the method 900 may be performed by a fraudulent email detection service as described with reference to FIGS. 1 through 7. In some examples, a fraudulent email detection service may execute a set of instructions to control the functional elements of the wireless fraudulent email detection service to perform the described functions. Additionally, or alternatively, the wireless fraudulent email detection service may perform aspects of the described functions using special-purpose hardware.

At 905, the method may include training a machine learning model with a list of known fraudulent users, a list of known authenticated users, and a set of multiple previously authenticated user activity logs associated with the list of known authenticated users. The operations of 905 may be performed in accordance with examples as disclosed herein. In some examples, aspects of the operations of 905 may be performed by a machine learning training component 645 as described with reference to FIG. 6.

At 910, the method may include receiving, via a cloud-based platform supporting a set of multiple tenants, metadata including a list of fields including the set of multiple previously authenticated user activity logs for a tenant of the set of multiple tenants and a set of multiple newly generated user activity logs associated with a set of multiple electronic communication messages for the tenant of the set of multiple tenants. The operations of 910 may be performed in accordance with examples as disclosed herein. In some examples, aspects of the operations of 910 may be performed by a cloud-based platform component 625 as described with reference to FIG. 6.

At 915, the method may include normalizing the metadata by extracting one or more fields from the list of fields and transforming into a format readable by the machine learning model, where the machine learning model is configured to identify a set of multiple fraudulent users associated with the set of multiple electronic communication messages. The operations of 915 may be performed in accordance with examples as disclosed herein. In some examples, aspects of the operations of 915 may be performed by a metadata normalizer component 630 as described with reference to FIG. 6.

At 920, the method may include identifying the set of multiple fraudulent users based on executing the machine learning model using the normalized metadata to perform a pattern matching between the set of multiple previously authenticated user activity logs and the set of multiple newly generated user activity logs. The operations of 920 may be performed in accordance with examples as disclosed herein. In some examples, aspects of the operations of 920 may be performed by a machine learning component 635 as described with reference to FIG. 6.

At 925, the method may include generating a report indicating the set of multiple fraudulent users, where a respective fraudulent user of the set of multiple fraudulent users is associated with a respective electronic communication message from the set of multiple electronic communication messages. The operations of 925 may be performed in accordance with examples as disclosed herein. In some examples, aspects of the operations of 925 may be performed by a report generator component 640 as described with reference to FIG. 6.

FIG. 10 shows a flowchart illustrating a method 1000 that supports content-oblivious fraudulent email detection system in accordance with aspects of the present disclosure. The operations of the method 1000 may be implemented by a fraudulent email detection service or its components as described herein. For example, the operations of the method 1000 may be performed by a fraudulent email detection service as described with reference to FIGS. 1 through 7. In some examples, a fraudulent email detection service may execute a set of instructions to control the functional elements of the wireless fraudulent email detection service to perform the described functions. Additionally, or alternatively, the wireless fraudulent email detection service may perform aspects of the described functions using special-purpose hardware.

At 1005, the method may include receiving, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants. The operations of 1005 may be performed in accordance with examples as disclosed herein. In some examples, aspects of the operations of 1005 may be performed by a cloud-based platform component 625 as described with reference to FIG. 6.

At 1010, the method may include normalizing the metadata by extracting one or more fields from the list of fields and transforming into a format readable by a machine learning model, where the machine learning model is configured to identify a set of multiple fraudulent users associated with the set of multiple electronic communication messages. The operations of 1010 may be performed in accordance with examples as disclosed herein. In some examples, aspects of the operations of 1010 may be performed by a metadata normalizer component 630 as described with reference to FIG. 6.

At 1015, the method may include generating a gibberish detection score for a respective user identifier associated with a respective newly generated user activity log of the set of multiple newly generated user activity logs. The operations of 1015 may be performed in accordance with examples as disclosed herein. In some examples, aspects of the operations of 1015 may be performed by a fraudulent user detection component 650 as described with reference to FIG. 6.

At 1020, the method may include detecting that the gibberish detection score satisfies a gibberish detection score threshold. The operations of 1020 may be performed in accordance with examples as disclosed herein. In some examples, aspects of the operations of 1020 may be performed by a fraudulent user detection component 650 as described with reference to FIG. 6.

At 1025, the method may include identifying that the respective user identifier is associated with a fraudulent user based on the gibberish detection score threshold being satisfied. The operations of 1025 may be performed in accordance with examples as disclosed herein. In some examples, aspects of the operations of 1025 may be performed by a fraudulent user detection component 650 as described with reference to FIG. 6.

At 1030, the method may include generating a report indicating the set of multiple fraudulent users, where a respective fraudulent user of the set of multiple fraudulent users is associated with a respective electronic communication message from the set of multiple electronic communication messages. The operations of 1030 may be performed in accordance with examples as disclosed herein. In some examples, aspects of the operations of 1030 may be performed by a report generator component 640 as described with reference to FIG. 6.

FIG. 11 shows a flowchart illustrating a method 1100 that supports content-oblivious fraudulent email detection system in accordance with aspects of the present disclosure. The operations of the method 1100 may be implemented by a fraudulent email detection service or its components as described herein. For example, the operations of the method 1100 may be performed by a fraudulent email detection service as described with reference to FIGS. 1 through 7. In some examples, a fraudulent email detection service may execute a set of instructions to control the functional elements of the wireless fraudulent email detection service to perform the described functions. Additionally, or alternatively, the wireless fraudulent email detection service may perform aspects of the described functions using special-purpose hardware.

At 1105, the method may include receiving, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants. The operations of 1105 may be performed in accordance with examples as disclosed herein. In some examples, aspects of the operations of 1105 may be performed by a cloud-based platform component 625 as described with reference to FIG. 6.

At 1110, the method may include normalizing the metadata by extracting one or more fields from the list of fields and transforming into a format readable by a machine learning model, where the machine learning model is configured to identify a set of multiple fraudulent users associated with the set of multiple electronic communication messages. The operations of 1110 may be performed in accordance with examples as disclosed herein. In some examples, aspects of the operations of 1110 may be performed by a metadata normalizer component 630 as described with reference to FIG. 6.

At 1115, the method may include determining an organization size associated a respective user identifier associated with a respective newly generated user activity log of the set of multiple newly generated user activity logs. The operations of 1115 may be performed in accordance with examples as disclosed herein. In some examples, aspects of the operations of 1115 may be performed by a fraudulent user detection component 650 as described with reference to FIG. 6.

At 1120, the method may include detecting a pattern between the respective user identifier and the user identifiers of a list of known fraudulent users and that the organization size satisfies an organization size threshold. The operations of 1120 may be performed in accordance with examples as disclosed herein. In some examples, aspects of the operations of 1120 may be performed by a fraudulent user detection component 650 as described with reference to FIG. 6.

At 1125, the method may include identifying the respective user identifier is associated with a fraudulent user based on the detected pattern and the organization size threshold being satisfied. The operations of 1125 may be performed in accordance with examples as disclosed herein. In some examples, aspects of the operations of 1125 may be performed by a fraudulent user detection component 650 as described with reference to FIG. 6.

At 1130, the method may include generating a report indicating the set of multiple fraudulent users, where a respective fraudulent user of the set of multiple fraudulent users is associated with a respective electronic communication message from the set of multiple electronic communication messages. The operations of 1130 may be performed in accordance with examples as disclosed herein. In some examples, aspects of the operations of 1130 may be performed by a report generator component 640 as described with reference to FIG. 6.

FIG. 12 shows a flowchart illustrating a method 1200 that supports content-oblivious fraudulent email detection system in accordance with aspects of the present disclosure. The operations of the method 1200 may be implemented by a fraudulent email detection service or its components as described herein. For example, the operations of the method 1200 may be performed by a fraudulent email detection service as described with reference to FIGS. 1 through 7. In some examples, a fraudulent email detection service may execute a set of instructions to control the functional elements of the wireless fraudulent email detection service to perform the described functions. Additionally, or alternatively, the wireless fraudulent email detection service may perform aspects of the described functions using special-purpose hardware.

At 1205, the method may include receiving, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants. The operations of 1205 may be performed in accordance with examples as disclosed herein. In some examples, aspects of the operations of 1205 may be performed by a cloud-based platform component 625 as described with reference to FIG. 6.

At 1210, the method may include normalizing the metadata by extracting one or more fields from the list of fields and transforming into a format readable by a machine learning model, where the machine learning model is configured to identify a set of multiple fraudulent users associated with the set of multiple electronic communication messages. The operations of 1210 may be performed in accordance with examples as disclosed herein. In some examples, aspects of the operations of 1210 may be performed by a metadata normalizer component 630 as described with reference to FIG. 6.

At 1215, the method may include determining a quantity of electronic communication messages associated with at least one of a respective user identifier from the set of multiple electronic communication messages, a time difference between a sign-up time associated with the respective user identifier and an electronic communication message transmission time, an organization size associated the respective user identifier, an application programming interface used to transmit an electronic communication message, or a combination thereof. The operations of 1215 may be performed in accordance with examples as disclosed herein. In some examples, aspects of the operations of 1215 may be performed by a fraudulent user detection component 650 as described with reference to FIG. 6.

At 1220, the method may include detecting that the quantity of electronic communication messages satisfies an electronic communication message quantity threshold, the time difference between the sign-up time and transmission of an electronic communication message satisfies a time difference threshold, the organization size satisfies an organization size threshold, that the application programming interface matches a mass-mail application programming interface, or any combination thereof. The operations of 1220 may be performed in accordance with examples as disclosed herein. In some examples, aspects of the operations of 1220 may be performed by a fraudulent user detection component 650 as described with reference to FIG. 6.

At 1225, the method may include identifying that the respective user identifier is associated with a fraudulent user based on detecting that the quantity of electronic communication messages satisfies the electronic communication message quantity threshold, the time difference satisfies the time difference threshold, the organization size satisfies the organization size threshold, that the application programming interface matches the mass-mail application programming interface, or any combination thereof. The operations of 1225 may be performed in accordance with examples as disclosed herein. In some examples, aspects of the operations of 1225 may be performed by a fraudulent user detection component 650 as described with reference to FIG. 6.

At 1230, the method may include generating a report indicating the set of multiple fraudulent users, where a respective fraudulent user of the set of multiple fraudulent users is associated with a respective electronic communication message from the set of multiple electronic communication messages. The operations of 1235 may be performed in accordance with examples as disclosed herein. In some examples, aspects of the operations of 1235 may be performed by a report generator component 640 as described with reference to FIG. 6.

A method for data processing is described. The method may include receiving, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants, normalizing the metadata by extracting one or more fields from the list of fields and transforming into a format readable by a machine learning model, where the machine learning model is configured to identify a set of multiple fraudulent users associated with the set of multiple electronic communication messages, identifying the set of multiple fraudulent users based on executing the machine learning model using the normalized metadata to perform a pattern matching between the set of multiple previously authenticated user activity logs and the set of multiple newly generated user activity logs, and generating a report indicating the set of multiple fraudulent users, where a respective fraudulent user of the set of multiple fraudulent users is associated with a respective electronic communication message from the set of multiple electronic communication messages.

An apparatus for data processing is described. The apparatus may include a processor, memory coupled with the processor, and instructions stored in the memory. The instructions may be executable by the processor to cause the apparatus to receive, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants, normalize the metadata by extracting one or more fields from the list of fields and transforming into a format readable by a machine learning model, where the machine learning model is configured to identify a set of multiple fraudulent users associated with the set of multiple electronic communication messages, identify the set of multiple fraudulent users based on executing the machine learning model using the normalized metadata to perform a pattern matching between the set of multiple previously authenticated user activity logs and the set of multiple newly generated user activity logs, and generate a report indicating the set of multiple fraudulent users, where a respective fraudulent user of the set of multiple fraudulent users is associated with a respective electronic communication message from the set of multiple electronic communication messages.

Another apparatus for data processing is described. The apparatus may include means for receiving, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants, means for normalizing the metadata by extracting one or more fields from the list of fields and transforming into a format readable by a machine learning model, where the machine learning model is configured to identify a set of multiple fraudulent users associated with the set of multiple electronic communication messages, means for identifying the set of multiple fraudulent users based on executing the machine learning model using the normalized metadata to perform a pattern matching between the set of multiple previously authenticated user activity logs and the set of multiple newly generated user activity logs, and means for generating a report indicating the set of multiple fraudulent users, where a respective fraudulent user of the set of multiple fraudulent users is associated with a respective electronic communication message from the set of multiple electronic communication messages.

A non-transitory computer-readable medium storing code for data processing is described. The code may include instructions executable by a processor to receive, via a cloud-based platform supporting a set of multiple tenants, metadata including a list of fields including a set of multiple previously authenticated user activity logs for a tenant of the set of multiple tenants and a set of multiple newly generated user activity logs associated with a set of multiple electronic communication messages for the tenant of the set of multiple tenants, normalize the metadata by extracting one or more fields from the list of fields and transforming into a format readable by a machine learning model, where the machine learning model is configured to identify a set of multiple fraudulent users associated with the set of multiple electronic communication messages, identify the set of multiple fraudulent users based on executing the machine learning model using the normalized metadata to perform a pattern matching between the set of multiple previously authenticated user activity logs and the set of multiple newly generated user activity logs, and generate a report indicating the set of multiple fraudulent users, where a respective fraudulent user of the set of multiple fraudulent users is associated with a respective electronic communication message from the set of multiple electronic communication messages.

Some examples of the method, apparatuses, and non-transitory computer-readable medium described herein may further include operations, features, means, or instructions for training the machine learning model with a list of known fraudulent users, a list of known authenticated users, and the set of multiple previously authenticated user activity logs associated with the list of known authenticated users.

In some examples of the method, apparatuses, and non-transitory computer-readable medium described herein, executing the machine learning model may include operations, features, means, or instructions for executing a set of multiple detection models using the normalized metadata to identify the set of multiple fraudulent users, where the set of multiple detection models may be configured to run concurrently for each electronic communication message of the set of multiple electronic communication messages.

In some examples of the method, apparatuses, and non-transitory computer-readable medium described herein, a fraudulent user may be detected if at least one detection model of the set of multiple detection models identifies a user of a respective electronic communication message of the set of multiple electronic communication messages as a fraudulent user.

In some examples of the method, apparatuses, and non-transitory computer-readable medium described herein, executing the set of multiple detection models may include operations, features, means, or instructions for executing one or more of a bulk sign up detection model, an impersonation detection model, a mass-mail detection model, or a combination thereof.

In some examples of the method, apparatuses, and non-transitory computer-readable medium described herein, executing the bulk sign up detection model may include operations, features, means, or instructions for generating a gibberish detection score for a respective user identifier associated with a respective newly generated user activity log of the set of multiple newly generated user activity logs, detecting that the gibberish detection score satisfies a gibberish detection score threshold, and identifying that the respective user identifier may be associated with a fraudulent user based on the gibberish detection score threshold being satisfied.

In some examples of the method, apparatuses, and non-transitory computer-readable medium described herein, executing the impersonation detection model may include operations, features, means, or instructions for determining an organization size associated a respective user identifier associated with a respective newly generated user activity log of the set of multiple newly generated user activity logs, detecting a pattern between the respective user identifier and the user identifiers of a list of known fraudulent users and that the organization size satisfies an organization size threshold, and identifying the respective user identifier may be associated with a fraudulent user based on the detected pattern and the organization size threshold being satisfied.

In some examples of the method, apparatuses, and non-transitory computer-readable medium described herein, executing the mass-mail detection model may include operations, features, means, or instructions for determining a quantity of electronic communication messages associated with at least one of a respective user identifier from the set of multiple electronic communication messages, a time difference between a sign-up time associated with the respective user identifier and an electronic communication message transmission time, an organization size associated the respective user identifier, an application programming interface used to transmit an electronic communication message, or a combination thereof, detecting that the quantity of electronic communication messages satisfies an electronic communication message quantity threshold, the time difference between the sign-up time and transmission of an electronic communication message satisfies a time difference threshold, the organization size satisfies an organization size threshold, that the application programming interface matches a mass-mail application programming interface, or any combination thereof, and identifying that the respective user identifier may be associated with a fraudulent user based on detecting that the quantity of electronic communication messages satisfies the electronic communication message quantity threshold, the time difference satisfies the time difference threshold, the organization size satisfies the organization size threshold, that the application programming interface matches the mass-mail application programming interface, or any combination thereof.

In some examples of the method, apparatuses, and non-transitory computer-readable medium described herein, normalizing the metadata may include operations, features, means, or instructions for extracting the one or more fields from each respective electronic communication message of the set of multiple electronic communication messages into a tabular format.

In some examples of the method, apparatuses, and non-transitory computer-readable medium described herein, a set of multiple columns of the tabular format for the normalized metadata may be associated with the list of fields in the metadata.

In some examples of the method, apparatuses, and non-transitory computer-readable medium described herein, the list of fields in the metadata for a respective newly generated user activity log of the set of multiple newly generated user activity logs include at least one of a username, an organization size, a sign-up date, or any combination thereof.

In some examples of the method, apparatuses, and non-transitory computer-readable medium described herein, the report indicating the set of multiple fraudulent users includes at least one of an organization identifier, a user identifier, an associated organization name, a creation date, or any combination thereof.

The following provides an overview of aspects of the present disclosure:

Aspect 1: A method for data processing, comprising: receiving, via a cloud-based platform supporting a plurality of tenants, metadata comprising a list of fields comprising a plurality of previously authenticated user activity logs for a tenant of the plurality of tenants and a plurality of newly generated user activity logs associated with a plurality of electronic communication messages for the tenant of the plurality of tenants; normalizing the metadata by extracting one or more fields from the list of fields and transforming into a format readable by a machine learning model, wherein the machine learning model is configured to identify a plurality of fraudulent users associated with the plurality of electronic communication messages; identifying the plurality of fraudulent users based at least in part on executing the machine learning model using the normalized metadata to perform a pattern matching between the plurality of previously authenticated user activity logs and the plurality of newly generated user activity logs; and generating a report indicating the plurality of fraudulent users, wherein a respective fraudulent user of the plurality of fraudulent users is associated with a respective electronic communication message from the plurality of electronic communication messages.

Aspect 2: The method of aspect 1, further comprising: training the machine learning model with a list of known fraudulent users, a list of known authenticated users, and the plurality of previously authenticated user activity logs associated with the list of known authenticated users.

Aspect 3: The method of any of aspects 1 through 2, wherein executing the machine learning model further comprises: executing a plurality of detection models using the normalized metadata to identify the plurality of fraudulent users, wherein the plurality of detection models are configured to run concurrently for each electronic communication message of the plurality of electronic communication messages.

Aspect 4: The method of aspect 3, wherein a fraudulent user is detected if at least one detection model of the plurality of detection models identifies a user of a respective electronic communication message of the plurality of electronic communication messages as a fraudulent user.

Aspect 5: The method of any of aspects 3 through 4, wherein executing the plurality of detection models comprises: executing one or more of a bulk sign up detection model, an impersonation detection model, a mass-mail detection model, or a combination thereof.

Aspect 6: The method of aspect 5, wherein executing the bulk sign up detection model further comprises: generating a gibberish detection score for a respective user identifier associated with a respective newly generated user activity log of the plurality of newly generated user activity logs; detecting that the gibberish detection score satisfies a gibberish detection score threshold; and identifying that the respective user identifier is associated with a fraudulent user based at least in part on the gibberish detection score threshold being satisfied.

Aspect 7: The method of any of aspects 5 through 6, wherein executing the impersonation detection model further comprises: determining an organization size associated a respective user identifier associated with a respective newly generated user activity log of the plurality of newly generated user activity logs; detecting a pattern between the respective user identifier and the user identifiers of a list of known fraudulent users and that the organization size satisfies an organization size threshold; and identifying the respective user identifier is associated with a fraudulent user based at least in part on the detected pattern and the organization size threshold being satisfied.

Aspect 8: The method of any of aspects 5 through 7, wherein executing the mass-mail detection model further comprises: determining a quantity of electronic communication messages associated with at least one of a respective user identifier from the plurality of electronic communication messages, a time difference between a sign-up time associated with the respective user identifier and an electronic communication message transmission time, an organization size associated the respective user identifier, an application programming interface used to transmit an electronic communication message, or a combination thereof; detecting that the quantity of electronic communication messages satisfies an electronic communication message quantity threshold, the time difference between the sign-up time and transmission of an electronic communication message satisfies a time difference threshold, the organization size satisfies an organization size threshold, that the application programming interface matches a mass-mail application programming interface, or any combination thereof; and identifying that the respective user identifier is associated with a fraudulent user based at least in part on detecting that the quantity of electronic communication messages satisfies the electronic communication message quantity threshold, the time difference satisfies the time difference threshold, the organization size satisfies the organization size threshold, that the application programming interface matches the mass-mail application programming interface, or any combination thereof.

Aspect 9: The method of any of aspects 1 through 8, wherein normalizing the metadata further comprises: extracting the one or more fields from each respective electronic communication message of the plurality of electronic communication messages into a tabular format.

Aspect 10: The method of aspect 9, wherein a plurality of columns of the tabular format for the normalized metadata are associated with the list of fields in the metadata.

Aspect 11: The method of any of aspects 1 through 10, wherein the list of fields in the metadata for a respective newly generated user activity log of the plurality of newly generated user activity logs include at least one of a username, an organization size, a sign-up date, or any combination thereof.

Aspect 12: The method of any of aspects 1 through 11, wherein the report indicating the plurality of fraudulent users includes at least one of an organization identifier, a user identifier, an associated organization name, a creation date, or any combination thereof.

Aspect 13: An apparatus for data processing, comprising a processor; memory coupled with the processor; and instructions stored in the memory and executable by the processor to cause the apparatus to perform a method of any of aspects 1 through 12.

Aspect 14: An apparatus for data processing, comprising at least one means for performing a method of any of aspects 1 through 12.

Aspect 15: A non-transitory computer-readable medium storing code for data processing, the code comprising instructions executable by a processor to perform a method of any of aspects 1 through 12.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for data processing, comprising:
receiving, via a cloud-based platform supporting a plurality of tenants, metadata for a tenant of the plurality of tenants, the metadata comprising a list of fields comprising a plurality of previously authenticated user activity logs associated with a first plurality of electronic communication messages and a plurality of newly generated user activity logs associated with a second plurality of electronic communication messages different from the first plurality of electronic communication messages, wherein each respective electronic communication message comprises a respective subject line and a respective set of content body text, and wherein the respective subject line and the respective set of content body text within each electronic communication message of the first plurality of electronic communication messages and the second plurality of electronic communication messages is absent from the metadata associated with the first plurality of electronic communication messages and the second plurality of electronic communication messages;
normalizing the metadata by extracting one or more fields from the list of fields and transforming into a format readable by a machine learning model, wherein the machine learning model is trained on the plurality of previously authenticated user activity logs associated with the first plurality of electronic communication messages and is configured to identify a plurality of fraudulent users associated with the second plurality of electronic communication messages based at least in part on a training of the machine learning model;
executing the machine learning model for identification of the plurality of fraudulent users based at least in part on inputting the normalized metadata into the machine learning model wherein the machine learning model is executed to perform a pattern matching between the plurality of previously authenticated user activity logs and the plurality of newly generated user activity logs; and
generating a report indicating the plurality of fraudulent users, wherein a respective fraudulent user of the plurality of fraudulent users is associated with a respective electronic communication message from the second plurality of electronic communication messages.
2. The method of claim 1, further comprising:
training the machine learning model with a list of known fraudulent users, a list of known authenticated users, and the plurality of previously authenticated user activity logs associated with the list of known authenticated users.
3. The method of claim 1, wherein executing the machine learning model further comprises:
executing a plurality of detection models using the normalized metadata to identify the plurality of fraudulent users, wherein the plurality of detection models are configured to run concurrently for each electronic communication message of the second plurality of electronic communication messages.
4. The method of claim 3, wherein a fraudulent user is detected if at least one detection model of the plurality of detection models identifies a user of the respective electronic communication message of the second plurality of electronic communication messages as a fraudulent user.

5. The method of claim 3, wherein executing the plurality of detection models comprises:

executing a bulk sign up detection model configured to identify a respective fraudulent user based at least in part on a gibberish detection score;

executing an impersonation detection model configured to identify a respective fraudulent user based at least in part on a detected pattern and organization size of the respective fraudulent user; and executing a mass-mail detection model configured to identify a respective fraudulent user based at least in part on a quantity of electronic communication messages.

6. The method of claim 5, wherein executing the bulk sign up detection model further comprises:

generating the gibberish detection score for a respective user identifier associated with a respective newly generated user activity log of the plurality of newly generated user activity logs;

detecting that the gibberish detection score satisfies a gibberish detection score threshold; and identifying that the respective user identifier is associated with a fraudulent user based at least in part on the gibberish detection score threshold being satisfied.

7. The method of claim 5, wherein executing the impersonation detection model further comprises:

determining the organization size associated with a respective user identifier associated with a respective newly generated user activity log of the plurality of newly generated user activity logs, the organization size associated with the respective user identifier corresponding to an organization associated with the respective user identifier;

detecting a pattern between the respective user identifier and user identifiers of a list of known fraudulent users and that the organization size satisfies an organization size threshold; and identifying the respective user identifier is associated with a fraudulent user based at least in part on the detected pattern and the organization size threshold being satisfied.

8. The method of claim 5, wherein executing the mass-mail detection model further comprises:

determining the quantity of electronic communication messages associated with at least one of a respective user identifier from the second plurality of electronic communication messages, a time difference between a sign-up time associated with the respective user identifier and an electronic communication message transmission time, an organization size associated with the respective user identifier, an application programming interface used to transmit an electronic communication message, or a combination thereof, the organization size associated with the respective user identifier corresponding to an organization associated with the respective user identifier;

detecting that the quantity of the electronic communication messages satisfies an electronic communication message quantity threshold, the time difference between the sign-up time and the electronic communication message transmission time satisfies a time difference threshold, the organization size satisfies an organization size threshold, that the application programming interface matches a mass-mail application programming interface, or any combination thereof; and identifying that the respective user identifier is associated with a fraudulent user based at least in part on detecting that the quantity of the electronic communication messages satisfies the electronic communication message quantity threshold, the time difference satisfies the time difference threshold, the organization size satisfies the organization size threshold, that the application programming interface matches the mass-mail application programming interface, or any combination thereof.

9. The method of claim 1, wherein normalizing the metadata further comprises:

extracting the one or more fields from each respective electronic communication message of the second plurality of electronic communication messages into a tabular format, wherein the one or more fields exclude the respective subject line and the respective set of content body text from each respective electronic communication message.

10. The method of claim 9, wherein a plurality of columns of the tabular format for the normalized metadata are associated with the list of fields in the metadata.

11. The method of claim 1, wherein the list of fields in the metadata for a respective newly generated user activity log of the plurality of newly generated user activity logs include at least one of a username, an organization size, a sign-up date, or any combination thereof, and wherein the organization size for the respective newly generated user activity log corresponding to an organization associated with the respective newly generated user activity log.

12. The method of claim 1, wherein the report indicating the plurality of fraudulent users includes at least one of an organization identifier of an organization corresponding to respective fraudulent users of the plurality of fraudulent users, a user identifier, an associated organization name of the organization corresponding to respective fraudulent users of the plurality of fraudulent users, a creation date, or any combination thereof.

13. An apparatus for data processing, comprising:

one or more processors;

one or more memories coupled with the one or more processors; and instructions stored in the one or more memories and executable by the one or more processors to cause the apparatus to:

receive, via a cloud-based platform supporting a plurality of tenants, metadata for a tenant of the plurality of tenants, the metadata comprising a list of fields comprising a plurality of previously authenticated user activity logs associated with a first plurality of electronic communication messages and a plurality of newly generated user activity logs associated with a second plurality of electronic communication messages different from the first plurality of electronic communication messages, wherein each respective electronic communication message comprises a respective subject line and a respective set of content body text, and wherein the respective subject line and the respective set of content body text within each electronic communication message of the first plurality of electronic communication messages and the second plurality of electronic communication messages is absent from the metadata associated with the first plurality of electronic communication messages and the second plurality of electronic communication messages;

normalize the metadata by extracting one or more fields from the list of fields and transforming into a format readable by a machine learning model, wherein the machine learning model is trained on the plurality of previously authenticated user activity logs associated with the first plurality of electronic communication messages and is configured to identify a plurality of fraudulent users associated with the second plurality of electronic communication messages based at least in part on a training of the machine learning model;

execute the machine learning model for identification of the plurality of fraudulent users based at least in part on the normalized metadata being input into the machine learning model wherein the machine learning model is executed to perform a pattern matching between the plurality of previously authenticated user activity logs and the plurality of newly generated user activity logs; and generate a report indicating the plurality of fraudulent users, wherein a respective fraudulent user of the plurality of fraudulent users is associated with a respective electronic communication message from the second plurality of electronic communication messages.

14. The apparatus of claim 13, wherein the instructions are further executable by the one or more processors to cause the apparatus to:

train the machine learning model with a list of known fraudulent users, a list of known authenticated users, and the plurality of previously authenticated user activity logs associated with the list of known authenticated users.

15. The apparatus of claim 13, wherein the instructions to execute the machine learning model are further executable by the one or more processors to cause the apparatus to:

execute a plurality of detection models using the normalized metadata to identify the plurality of fraudulent users, wherein the plurality of detection models are configured to run concurrently for each electronic communication message of the second plurality of electronic communication messages.

16. The apparatus of claim 15, wherein a fraudulent user is detected if at least one detection model of the plurality of detection models identifies a user of the respective electronic communication message of the second plurality of electronic communication messages as a fraudulent user.

17. The apparatus of claim 15, wherein the instructions to execute the plurality of detection models are executable by the one or more processors to cause the apparatus to:

executing a bulk sign up detection model configured to identify a respective fraudulent user based at least in part on a gibberish detection score;

executing an impersonation detection model configured to identify a respective fraudulent user based at least in part on a detected pattern and organization size of the respective fraudulent user; and executing a mass-mail detection model configured to identify a respective fraudulent user based at least in part on a quantity of electronic communication messages.

18. The apparatus of claim 13, wherein the instructions to normalize the metadata are further executable by the one or more processors to cause the apparatus to:

extract the one or more fields from each respective electronic communication message of the second plurality of electronic communication messages into a tabular format, wherein the one or more fields exclude the respective subject line and the respective set of content body text from each respective electronic communication message.

19. A non-transitory computer-readable medium storing code for data processing, the code comprising instructions executable by a one or more processors to:

receive, via a cloud-based platform supporting a plurality of tenants, metadata for a tenant of the plurality of tenants, the metadata comprising a list of fields comprising a plurality of previously authenticated user activity logs associated with a first plurality of electronic communication messages and a plurality of newly generated user activity logs associated with a second plurality of electronic communication messages different from the first plurality of electronic communication messages, wherein each respective electronic communication message comprises a respective subject line and a respective set of content body text, and wherein the respective subject line and the respective set of content body text within each electronic communication message of the first plurality of electronic communication messages and the second plurality of electronic communication messages is absent from the metadata associated with the first plurality of electronic communication messages and the second plurality of electronic communication messages;

normalize the metadata by extracting one or more fields from the list of fields and transforming into a format readable by a machine learning model, wherein the machine learning model is trained on the plurality of previously authenticated user activity logs associated with the first plurality of electronic communication messages and is configured to identify a plurality of fraudulent users associated with the second plurality of electronic communication messages based at least in part on a training of the machine learning model;

execute the machine learning model for identification of the plurality of fraudulent users based at least in part on the normalized metadata being input into the machine learning model wherein the machine learning model is executed to perform a pattern matching between the plurality of previously authenticated user activity logs and the plurality of newly generated user activity logs; and generate a report indicating the plurality of fraudulent users, wherein a respective fraudulent user of the plurality of fraudulent users is associated with a respective electronic communication message from the second plurality of electronic communication messages.

* * * * *